US010844081B2

(12) United States Patent
Burke et al.

(10) Patent No.: US 10,844,081 B2
(45) Date of Patent: *Nov. 24, 2020

(54) PROTECTED ORGANOBORONIC ACIDS WITH TUNABLE REACTIVITY, AND METHODS OF USE THEREOF

(71) Applicant: The Board of Trustees of the University of Illinois, Urbana, IL (US)

(72) Inventors: Martin D. Burke, Champaign, IL (US); Michael Schmidt, Urbana, IL (US); Greg Morehouse, Urbana, IL (US); Robert W. Pipal, Wheaton, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/751,007

(22) PCT Filed: Aug. 8, 2016

(86) PCT No.: PCT/US2016/045956
§ 371 (c)(1),
(2) Date: Feb. 7, 2018

(87) PCT Pub. No.: WO2017/027435
PCT Pub. Date: Feb. 16, 2017

(65) Prior Publication Data
US 2018/0230170 A1 Aug. 16, 2018

Related U.S. Application Data

(60) Provisional application No. 62/202,437, filed on Aug. 7, 2015.

(51) Int. Cl.
*C07F 5/04* (2006.01)
*C07F 5/02* (2006.01)

(52) U.S. Cl.
CPC . *C07F 5/04* (2013.01); *C07F 5/02* (2013.01)

(58) Field of Classification Search
CPC .......................................... C07F 5/04
USPC ........................................... 549/213
See application file for complete search history.

(56) References Cited

U.S. PATENT DOCUMENTS

| 8,013,203 | B2 | 9/2011 | Burke et al. |
| 8,338,601 | B2 | 12/2012 | Burke et al. |
| 2014/0256657 | A1 | 9/2014 | Gaul et al. |
| 2018/0230170 | A1 | 8/2018 | Burke et al. |

FOREIGN PATENT DOCUMENTS

| WO | WO-2014/071007 A1 | 5/2014 |
| WO | WO-2014/091167 A2 | 6/2014 |
| WO | WO-2014/120346 A1 | 8/2014 |
| WO | WO-2016/205790 A2 | 12/2016 |

OTHER PUBLICATIONS

International Search Report and Written Opinion for International Application No. PCT/US16/45956 dated Oct. 28, 2016.
Close et al., "Microwave-mediated synthesis of N-methyliminodiacetic acid (MIDA) boronates," Tetrahedron, 70(47):9125-9131 (2014).
Partial Supplementary European Search Report Received for EP Application No. 16835733.3 dated Jan. 31, 2019.
Extended European Search Report issued by the European Patent Office in corresponding Application No. PCT/US2016/045956 dated Feb. 5, 2019.

*Primary Examiner* — Taofiq A Solola
(74) *Attorney, Agent, or Firm* — Foley Hoag LLP

(57) ABSTRACT

Disclosed are a range of protected organoboronic acid reagents useful in the modular assembly of complex organic compounds. The reactivities of the protected organoboronic acid reagents may be varied predictably by changes to the number and identities of their substituents. Also disclosed are methods of using the protected organoboronic acid reagents in the synthesis of organic compounds.

23 Claims, 10 Drawing Sheets

PROTECTED ORGANOBORONIC ACIDS WITH TUNABLE REACTIVITY, AND METHODS OF USE THEREOF

RELATED APPLICATION

This application is a national stage entry under 35 U.S.C. § 371 of PCT/US16/045956, filed Aug. 8, 2016, which claims the benefit of priority to U.S. Provisional Patent Application Ser. No. 62/202,437, filed Aug. 7, 2015.

BACKGROUND OF THE INVENTION

The Suzuki-Miyaura reaction is a palladium- or nickel-catalyzed cross coupling between a boronic acid or a boronic ester, and an organohalide or an organo-pseudohalide. Miyaura, A. *Chem. Rev.*, 1995. This cross coupling transformation is a powerful method for C—C bond formation in complex molecule synthesis. The reaction is tolerant of functional groups and has become increasingly general and widespread in its use for coupling of organic compounds (Barder, 2005; Billingsley, 2007; Littke, 2000; Nicolaou, 2005).

Organoboronic acids are notoriously sensitive to many common reagents (Hall, 2005; Tyrell, 2003). It is therefore typical to introduce the boronic acid functional group during the last step of a building block synthesis. However, many of the methods for doing so (hydroboration, trapping organometallic reagents with trimethylborate, etc.) are intolerant to a variety of common functional groups, such as alcohols, aldehydes, ketones, alkynes and olefins. This makes the synthesis of structurally complex organoboronic acid building blocks quite challenging.

One area of research on the Suzuki-Miyaura reaction is the development of protecting groups for the boronic acid functional group. A compound that includes a protected boronic acid group and another functional group can undergo chemical transformations of the other functional group without chemically transforming the boron. Removal of the protecting group (deprotection) then provides the free boronic acid group, which can undergo a Suzuki-Miyaura reaction to cross-couple the compound with an organohalide or an organo-pseudohalide.

In one example of a boronic acid protecting group, each of the two B—OH groups is converted into a boronic ester group (>B—O—R) or a boronic amide group (>B—NH—R), where R is an organic group. The organic group can be removed by hydrolysis to provide the free boronic acid group (Deng, 2002; Hohn, 2004; Holmes, 2006; Noguchi, 2007). The heteroatom-boron bonds in these protected compounds tend to be very strong, however. The relatively harsh conditions required for cleaving these ligands typically are incompatible with complex molecule synthesis. In another example of a boronic acid protecting group, three organoboronic acid molecules can be condensed to form a cyclic boroxine (Kerins, 2002). These protected organoboronic acids, however, tend to be unstable to long-term storage.

The reactivity of a boronic acid group also may be decreased by conversion of the boronic acid group into a tetracoordinate anion, such as $[R-BF_3]^-$, where R represents an organic group. These anions may be present as salts with a counterion, such as $K^+$ or $Na^+$ (Molander, 2007). Another class of tetracoordinate boron anions, $[R-B(OH)_3]^-$, has been reported in the context of purifying organoboronic acids for use in the Suzuki-Miyaura reaction (Cammidge, 2006). In each of these systems, the boron itself is not protected from the Suzuki-Miyaura reaction, but can be used directly in the coupling transformation.

Recently, it was discovered that N-methyliminodiacetic acid (MIDA) boronates can be used to protect boronic acid functional groups from a variety of chemical reactions (Gillis, 2007; Lee, 2008). These MIDA boronates are stable to air and to purification by chromatography, and do not cross-couple under anhydrous conditions. However, the MIDA boronates can be hydrolyzed rapidly with aqueous NaOH (<10 minutes at 23° C.) to release the corresponding unprotected organoboronic acid. Thus, MIDA boronates can be used as convenient surrogates for stable organoboronic acids under aqueous NaOH-promoted Suzuki-Miyaura coupling conditions. This approach has been shown to be effective for both aryl- and alkenyl-MIDA boronates. The only change to the standard coupling protocol is the inclusion of extra base to hydrolyze the MIDA boronate. The cleaved $MIDA^{2-}$ ion appears to have no deleterious effect on these reactions, even though it is known to be a ligand for Pd(II).

The published synthetic methods for protection of organoboronic acids as MIDA boronates have been less successful when used to protect unstable organoboronic acids. Unstable organoboronic acids are susceptible to degradation, which can preclude their benchtop storage and/or their efficient cross coupling. When MIDA boronates of unstable boronic acids are simultaneously deprotected and reacted with an organohalide or organopseudohalide under NaOH-promoted Suzuki-Miyaura coupling conditions, the yield of cross-coupled product can be undesirably low. Examples of unstable organoboronic acids include 2-heterocyclic boronic acids (Billingsley, 2007; Tyrrell, 2003), vinyl boronic acids (Matteson, 1960), and cyclopropyl boronic acids (Wallace, 2002). Although unstable organoboronic acids can be successfully prepared and stored in the form of their corresponding MIDA boronates, the deprotected organoboronic acids may be susceptible to degradation during their subsequent use.

U.S. Pat. No. 8,013,203 (incorporated by reference), U.S. Pat. No. 8,318,983 (incorporated by reference), and US 2013/0296573 (incorporated by reference), each to Burke et al., disclose protected organoboronic acid compounds comprising a boron having an $sp^3$ hybridization, a conformationally rigid protecting group bonded to the boron, and an organic group bonded to the boron through a boron-carbon bond; methods of making same; and methods of performing chemical reactions using same. In an embodiment, the protected organoboronic acid is an N-methyliminodiacetic acid (MIDA) boronate.

U.S. Pat. No. 8,338,601 (incorporated by reference) and US 2013/0317223 (incorporated by reference), each to Burke et al., disclose methods of performing chemical reactions using protected organoboronic acid compounds. In an embodiment, the protected organoboronic acid is a MIDA boronate. In an embodiment, the reaction is a cross coupling reaction.

U.S. Pat. No. 8,557,980 (incorporated by reference) and US 2014/0073785 (incorporated by reference), each to Burke et al., disclose methods of forming protected boronic acids that provide a wide variety of building blocks for use in chemical reactions. In an embodiment, the protected boronic acid is a MIDA boronate. In an embodiment, the reaction is a cross coupling reaction.

US 2013/0243670 (incorporated by reference) to Burke et al. discloses methods and an apparatus for purification of MIDA boronates and deprotection of boronic acids from their MIDA ligands to perform cross coupling reactions.

Iterative cycles of deprotection, coupling, and purification can be used to synthesize small molecules.

U.S. Pat. No. 9,012,658 (incorporated by reference) to Burke et al. discloses methods of making and using chiral, non-racemic protected organoboronic acid compounds to direct and enable stereoselective synthesis of organic molecules. In an embodiment, the chiral, non-racemic protected organoboronic acid compounds are chiral derivatives of iminodiacetic acid (IDA).

SUMMARY OF THE INVENTION

An aspect of the invention is a compound represented by formula I

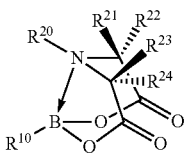

I wherein independently for each occurrence
$R^{10}$ is an organic group;
B is a boron having $sp^3$ hybridization;
$R^{20}$ is an organic group;
each of $R^{21}$ and $R^{24}$ is selected from the group consisting of H, alkyl, alkenyl, alkynyl, aryl, heteroaryl, aralkyl, and heteroaralkyl; or $R^{21}$ and $R^{24}$ taken together form a substituted or unsubstituted $C_1$-$C_5$ alkylene or $C_2$-$C_5$ alkenylene bridge between the carbon atoms to which they are attached, wherein any substituent on the $C_1$-$C_5$ alkylene or $C_2$-$C_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms;
each of $R^{22}$ and $R^{23}$ is selected from the group consisting of H, alkyl, alkenyl, alkynyl, aryl, heteroaryl, aralkyl, and heteroaralkyl;
$R^{21}$ and $R^{22}$, together with the carbon atom to which they are attached, may form a substituted or unsubstituted cycloalkyl, heterocycloalkyl, cycloalkenyl, or heterocycloalkenyl group; or $R^{21}$ and $R^{22}$, together with the carbon to which they are attached, may form a substituted or unsubstituted 3- to 6-membered carbocyclic or heterocyclic ring; and
$R^{23}$ and $R^{24}$, together with the carbon atom to which they are attached, may form a substituted or unsubstituted cycloalkyl, heterocycloalkyl, cycloalkenyl, or heterocycloalkenyl group; or $R^{23}$ and $R^{24}$, together with the carbon to which they are attached, may form a substituted or unsubstituted 3- to 6-membered carbocyclic or heterocyclic ring;
provided that if (i) $R^{21}$ and $R^{24}$ taken together do not form a substituted or unsubstituted $C_1$-$C_5$ alkylene or $C_2$-$C_5$ alkenylene bridge; and (ii) $R^{21}$ and $R^{22}$, together with the carbon to which they are attached, do not form a substituted or unsubstituted 3- to 6-membered carbocyclic or heterocyclic ring; and (iii) $R^{23}$ and $R^{24}$, together with the carbon to which they are attached, do not form a substituted or unsubstituted 3- to 6-membered carbocyclic or heterocyclic ring, then:
(a) if $R^{20}$ is selected from the group consisting of methyl, isopropyl, 1-phenylethyl, 6,6-dimethylbicyclo[3.1.1]heptan-3-yl, 1-cyclohexylethyl, 2,6,6-trimethylbicyclo[3.1.1]heptan-3-yl, 1-benzyloxy-5-cyclopentyl, 2-(benzyloxy)cyclopentyl, 1,2,3,4-tetrahydronaphthalen-1-yl, 1-(4-methoxyphenyl)ethyl, 3,3-dimethylbutan-2-yl, 1-(naphthalen-1-yl)ethyl, and 1-phenylbutan-2-yl, then at least one of $R^{21}$, $R^{22}$, $R^{23}$, and $R^{24}$ is not H;
(b) if $R^{10}$ is phenyl and $R^{20}$ is methyl and $R^{21}$ is o-, m-, or p-$CH_3C_6H_4CH_2$—, then at least one of $R^{22}$, $R^{23}$, and $R^{24}$ is not H;
(c) if $R^{10}$ is phenyl and $R^{20}$ is methyl and $R^{22}$ is o-, m-, or p-$CH_3C_6H_4CH_2$—, then at least one of $R^{21}$, $R^{23}$, and $R^{24}$ is not H;
(d) if $R^{10}$ is phenyl and $R^{20}$ is benzyl and $R^{21}$ is a radical selected from the group consisting of methyl, ethyl, n-propyl, and n-butyl, then at least one of $R^{22}$, $R^{23}$, and $R^{24}$ is not H; and
(e) if $R^{10}$ is phenyl and $R^{20}$ is benzyl and $R^{22}$ is a radical selected from the group consisting of methyl, ethyl, n-propyl, and n-butyl, then at least one of $R^{21}$, $R^{23}$, and $R^{24}$ is not H.

An aspect of the invention is a method of performing a chemical reaction, the method comprising the step of:
combining a compound of the invention and a reagent, whereby $R^{10}$ is chemically transformed, and
the boron is not chemically transformed.

An aspect of the invention is a method of performing a chemical reaction, the method comprising the step of:
combining a compound of any one of claims 1-21, an organohalide, a palladium catalyst, and an aqueous base,
thereby to provide a cross-coupled product, wherein $R^{10}$ has replaced the halide moiety of the organohalide.

An aspect of the invention is a method of performing a chemical reaction represented by:

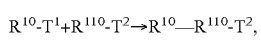

the method comprising the step of: combining a first protected organoboronic acid, represented by $R^{10}$-$T^1$, and a second protected organoboronic acid, represented by $R^{110}$-$T^2$, under conditions wherein the rate of hydrolysis of the first protected organoboronic acid is at least about five times greater than the rate of hydrolysis of the second protected organoboronic acid;
whereby at least about 50 percent of $R^{110}$ is chemically transformed before about 10 percent of the boron of the second protected organoboronic acid is transformed; wherein
$R^{10}$-$T^1$ is a compound represented by formula I

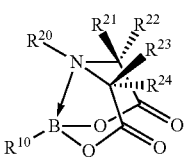

I wherein independently for each occurrence
$R^{10}$ is an organic group;
B is a boron having $sp^3$ hybridization;
$R^{20}$ is an organic group;
each of $R^{21}$ and $R^{24}$ is selected from the group consisting of H, alkyl, alkenyl, alkynyl, aryl, heteroaryl, aralkyl, and heteroaralkyl; or $R^{21}$ and $R^{24}$ taken together form a substituted or unsubstituted $C_1$-$C_5$ alkylene or $C_2$-$C_5$ alkenylene bridge between the carbon atoms to which they are attached, wherein any substituent on the $C_1$-$C_5$ alkylene or $C_2$-$C_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms;

each of $R^{22}$ and $R^{23}$ is selected from the group consisting of H, alkyl, alkenyl, alkynyl, aryl, heteroaryl, aralkyl, and heteroaralkyl;

$R^{21}$ and $R^{22}$, together with the carbon atom to which they are attached, may form a substituted or unsubstituted cycloalkyl, heterocycloalkyl, cycloalkenyl, or heterocycloalkenyl group; or $R^{21}$ and $R^{22}$, together with the carbon to which they are attached, may form a substituted or unsubstituted 3- to 6-membered carbocyclic or heterocyclic ring; and $R^{23}$ and $R^{24}$, together with the carbon atom to which they are attached, may form a substituted or unsubstituted cycloalkyl, heterocycloalkyl, cycloalkenyl, or heterocycloalkenyl group; or $R^{23}$ and $R^{24}$, together with the carbon to which they are attached, may form a substituted or unsubstituted 3- to 6-membered carbocyclic or heterocyclic ring;

provided that if (i) $R^{21}$ and $R^{24}$ taken together do not form a substituted or unsubstituted $C_1$-$C_5$ alkylene or $C_2$-$C_5$ alkenylene bridge; and (ii) $R^{21}$ and $R^{22}$, together with the carbon to which they are attached, do not form a substituted or unsubstituted 3- to 6-membered carbocyclic or heterocyclic ring; and (iii) $R^{23}$ and $R^{24}$, together with the carbon to which they are attached, do not form a substituted or unsubstituted 3- to 6-membered carbocyclic or heterocyclic ring, then:

(a) if $R^{20}$ is selected from the group consisting of methyl, isopropyl, 1-phenylethyl, 6,6-dimethylbicyclo[3.1.1]heptan-3-yl, 1-cyclohexylethyl, 2,6,6-trimethylbicyclo[3.1.1]heptan-3-yl, 1-benzyloxy-5-cyclopentyl, 2-(benzyloxy)cyclopentyl, 1,2,3,4-tetrahydronaphthalen-1-yl, 1-(4-methoxyphenyl)ethyl, 3,3-dimethylbutan-2-yl, 1-(naphthalen-1-yl)ethyl, and 1-phenylbutan-2-yl, then at least one of $R^{21}$, $R^{22}$, $R^{23}$, and $R^{24}$ is not H;

(b) if $R^{10}$ is phenyl and $R^{20}$ is methyl and $R^{21}$ is o-, m-, or p-$CH_3C_6H_4CH_2$—, then at least one of $R^{22}$, $R^{23}$, and $R^{24}$ is not H;

(c) if $R^{10}$ is phenyl and $R^{20}$ is methyl and $R^{22}$ is o-, m-, or p-$CH_3C_6H_4CH_2$—, then at least one of $R^{21}$, $R^{23}$, and $R^{24}$ is not H;

(d) if $R^{10}$ is phenyl and $R^{20}$ is benzyl and $R^{21}$ is a radical selected from the group consisting of methyl, ethyl, n-propyl, and n-butyl, then at least one of $R^{22}$, $R^{23}$, and $R^{24}$ is not H; and (e) if $R^{10}$ is phenyl and $R^{20}$ is benzyl and $R^{22}$ is a radical selected from the group consisting of methyl, ethyl, n-propyl, and n-butyl, then at least one of $R^{21}$, $R^{23}$, and $R^{24}$ is not H;

$R^{110}$-$T^2$ is a compound represented by formula II

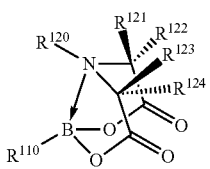

II wherein independently for each occurrence
$R^{110}$ is a third organic group;
B is a second boron having $sp^3$ hybridization;
$R^{120}$ is a fourth organic group;

each of $R^{121}$ and $R^{124}$ is selected from the group consisting of H, alkyl, alkenyl, alkynyl, aryl, heteroaryl, aralkyl, and heteroaralkyl; or $R^{121}$ and $R^{124}$ taken together form a substituted or unsubstituted $C_1$-$C_5$ alkylene or $C_2$-$C_5$ alkenylene bridge between the carbon atoms to which they are attached, wherein any substituent on the $C_1$-$C_5$ alkylene or $C_2$-$C_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms;

each of $R^{122}$ and $R^{123}$ is selected from the group consisting of H, alkyl, alkenyl, alkynyl, aryl, heteroaryl, aralkyl, and heteroaralkyl;

$R^{121}$ and $R^{122}$, together with the carbon atom to which they are attached, may form a substituted or unsubstituted cycloalkyl, heterocycloalkyl, cycloalkenyl, or heterocycloalkenyl group; or $R^{121}$ and $R^{122}$, together with the carbon to which they are attached, may form a substituted or unsubstituted 3- to 6-membered carbocyclic or heterocyclic ring; and $R^{123}$ and $R^{124}$, together with the carbon atom to which they are attached, may form a substituted or unsubstituted cycloalkyl, heterocycloalkyl, cycloalkenyl, or heterocycloalkenyl group; or $R^{123}$ and $R^{124}$, together with the carbon to which they are attached, may form a substituted or unsubstituted 3- to 6-membered carbocyclic or heterocyclic ring;

provided that if (i) $R^{121}$ and $R^{124}$ taken together do not form a substituted or unsubstituted $C_1$-$C_5$ alkylene or $C_2$-$C_5$ alkenylene bridge; and (ii) $R^{121}$ and $R^{122}$, together with the carbon to which they are attached, do not form a substituted or unsubstituted 3- to 6-membered carbocyclic or heterocyclic ring; and (iii) $R^{123}$ and $R^{124}$, together with the carbon to which they are attached, do not form a substituted or unsubstituted 3- to 6-membered carbocyclic or heterocyclic ring, then:

(a) if $R^{120}$ is selected from the group consisting of methyl, isopropyl, 1-phenylethyl, 6,6-dimethylbicyclo[3.1.1]heptan-3-yl, 1-cyclohexylethyl, 2,6,6-trimethylbicyclo[3.1.1]heptan-3-yl, 1-benzyloxy-5-cyclopentyl, 2-(benzyloxy)cyclopentyl, 1,2,3,4-tetrahydronaphthalen-1-yl, 1-(4-methoxyphenyl)ethyl, 3,3-dimethylbutan-2-yl, 1-(naphthalen-1-yl)ethyl, and 1-phenylbutan-2-yl, then at least one of $R^{121}$, $R^{122}$, $R^{123}$, and $R^{124}$ is not H;

(b) if $R^{110}$ is phenyl and $R^{120}$ is methyl and $R^{121}$ is o-, m-, or p-$CH_3C_6H_4CH_2$—, then at least one of $R^{122}$, $R^{123}$, and $R^{124}$ is not H;

(c) if $R^{110}$ is phenyl and $R^{120}$ is methyl and $R^{122}$ is o-, m-, or p-$CH_3C_6H_4CH_2$—, then at least one of $R^{121}$, $R^{123}$, and $R^{124}$ is not H;

(d) if $R^{110}$ is phenyl and $R^{120}$ is benzyl and $R^{121}$ is a radical selected from the group consisting of methyl, ethyl, n-propyl, and n-butyl, then at least one of $R^{122}$, $R^{123}$, and $R^{124}$ is not H; and (e) if $R^{110}$ is phenyl and $R^{120}$ is benzyl and $R^{122}$ is a radical selected from the group consisting of methyl, ethyl, n-propyl, and n-butyl, then at least one of $R^{121}$, $R^{123}$, and $R^{124}$ is not H.

In certain embodiments, the method further comprises performing a chemical reaction represented by

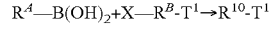

wherein independently for each occurrence
$R^A$ is a fifth organic group;
$R^A$—$B(OH)_2$ is a first free organoboronic acid;

$X-R^B-T^1$ is a compound represented by formula III

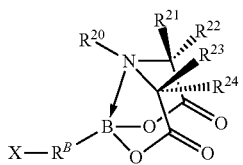

wherein independently for each occurrence
X is a halogen;
$R^B$ is a sixth organic group;
B, $R^{20}$, $R^{21}$, $R^{22}$, $R^{23}$, and $R^{24}$ are identical to B, $R^{20}$, $R^{21}$, $R^{22}$, $R^{23}$, and $R^{24}$ of formula I; and
$R^A-R^B-$ is $R^{10}-$.

In certain embodiments, the method further comprises performing a chemical reaction represented by

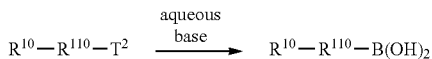

wherein
$R^{10}-R^{110}-B(OH)_2$ is a second free organoboronic acid.

In certain embodiments, the method further comprises performing a chemical reaction represented by

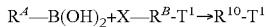

wherein independently for each occurrence
$R^A$ is a fifth organic group;
$R^A-B(OH)_2$ is a first free organoboronic acid;
$X-R^B-T^1$ is a compound represented by formula III

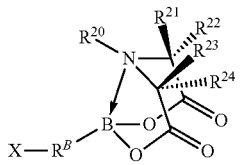

wherein independently for each occurrence
X is a halogen;
$R^B$ is a sixth organic group;
B, $R^{20}$, $R^{21}$, $R^{22}$, $R^{23}$, and $R^{24}$ are identical to B, $R^{20}$, $R^{21}$, $R^{22}$, $R^{23}$, and $R^{24}$ of formula I; and
$R^A-R^B-$ is $R^{10}-$; and
performing a chemical reaction represented by

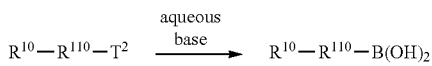

wherein
$R^{10}-R^{110}-B(OH)_2$ is a second free organoboronic acid.

An aspect of the invention is a method of performing a chemical reaction represented by

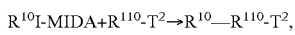

the method comprising the step of: combining a first protected organoboronic acid, represented by $R^{10}$-MIDA, and a second protected organoboronic acid, represented by $R^{110}$-$T^2$, under conditions wherein the rate of hydrolysis of the first protected organoboronic acid is at least about two times greater than the rate of hydrolysis of the second protected organoboronic acid, whereby at least about 50 percent of $R^{110}$ is chemically transformed before about 10 percent of the boron of the second protected organoboronic acid $R^{110}$-$T^2$ is transformed; wherein $R^{10}$-MIDA is a compound represented by formula III

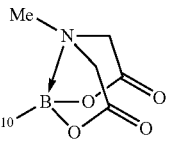

wherein independently for each occurrence
$R^{10}$ is a first organic group;
B is a first boron having sp³ hybridization;
$R^{110}$-$T^2$ is a compound represented by formula II

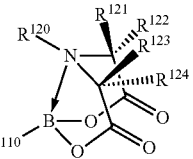

wherein independently for each occurrence
$R^{110}$ is a second organic group;
B is a second boron having sp³ hybridization;
$R^{120}$ is a third organic group;
each of $R^{121}$ and $R^{124}$ is selected from the group consisting of H, alkyl, alkenyl, alkynyl, aryl, heteroaryl, aralkyl, and heteroaralkyl; or $R^{121}$ and $R^{124}$ taken together form a substituted or unsubstituted $C_1$-$C_5$ alkylene or $C_2$-$C_5$ alkenylene bridge between the carbon atoms to which they are attached, wherein any substituent on the $C_1$-$C_5$ alkylene or $C_2$-$C_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms;
each of $R^{122}$ and $R^{123}$ is selected from the group consisting of H, alkyl, alkenyl, alkynyl, aryl, heteroaryl, aralkyl, and heteroaralkyl;
$R^{121}$ and $R^{122}$, together with the carbon atom to which they are attached, may form a substituted or unsubstituted cycloalkyl, heterocycloalkyl, cycloalkenyl, or heterocycloalkenyl group; or $R^{121}$ and $R^{122}$, together with the carbon to which they are attached, may form a substituted or unsubstituted 3- to 6-membered carbocyclic or heterocyclic ring; and
$R^{123}$ and $R^{124}$, together with the carbon atom to which they are attached, may form a substituted or unsubstituted cycloalkyl, heterocycloalkyl, cycloalkenyl, or heterocycloalkenyl group; or $R^{123}$ and $R^{124}$, together with the carbon to which they are attached, may form a substituted or unsubstituted 3- to 6-membered carbocyclic or heterocyclic ring;
provided that if (i) $R^{121}$ and $R^{124}$ taken together do not form a substituted or unsubstituted $C_1$-$C_5$ alkylene or $C_2$-$C_5$ alkenylene bridge; and (ii) $R^{121}$ and $R^{122}$, together with the carbon to which they are attached, do not form a substituted or unsubstituted 3- to 6-membered carbocyclic or heterocyclic ring; and (iii) $R^{123}$ and $R^{124}$, together with the carbon to which they are attached, do not form a substituted or unsubstituted 3- to 6-membered carbocyclic or heterocyclic ring, then:

(a) if $R^{120}$ is selected from the group consisting of methyl, isopropyl, 1-phenylethyl, 6,6-dimethylbicyclo[3.1.1]heptan-3-yl, 1-cyclohexylethyl, 2,6,6-trimethylbicyclo[3.1.1]heptan-3-yl, 1-benzyloxy-5-cyclopentyl, 2-(benzyloxy)cyclopentyl, 1,2,3,4-tetrahydronaphthalen-1-yl, 1-(4-methoxyphenyl)ethyl, 3,3-dimethylbutan-2-yl, 1-(naphthalen-1-yl)ethyl, and 1-phenylbutan-2-yl, then at least one of $R^{121}$, $R^{122}$, $R^{123}$, and $R^{124}$ is not H;

(b) if $R^{110}$ is phenyl and $R^{120}$ is methyl and $R^{121}$ is o-, m-, or p-CH$_3$C$_6$H$_4$CH$_2$—, then at least one of $R^{122}$, $R^{123}$, and $R^{124}$ is not H;

(c) if $R^{110}$ is phenyl and $R^{120}$ is methyl and $R^{122}$ is o-, m-, or p-CH$_3$C$_6$H$_4$CH$_2$—, then at least one of $R^{121}$, $R^{123}$, and $R^{124}$ is not H;

(d) if $R^{110}$ is phenyl and $R^{120}$ is benzyl and $R^{121}$ is a radical selected from the group consisting of methyl, ethyl, n-propyl, and n-butyl, then at least one of $R^{122}$, $R^{123}$, and $R^{124}$ is not H; and (e) if $R^{110}$ is phenyl and $R^{120}$ is benzyl and $R^{122}$ is a radical selected from the group consisting of methyl, ethyl, n-propyl, and n-butyl, then at least one of $R^{121}$, $R^{123}$, and $R^{124}$ is not H.

In certain embodiments, the method further comprises performing a chemical reaction represented by

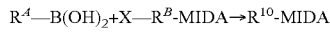

wherein independently for each occurrence
X is a halogen;
$R^B$ is a fifth organic group;
B is identical to B of formula III; and
$R^A$—$R^B$— is $R^{10}$—.

In certain embodiments, the method further comprises performing a chemical reaction represented by

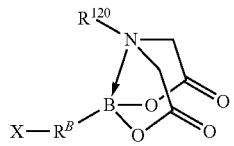

wherein
$R^{10}$—$R^{110}$—B(OH)$_2$ is a second free organoboronic acid.

In certain embodiments, the method further comprises the method further comprises performing a chemical reaction represented by

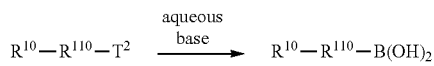

wherein independently for each occurrence
$R^A$ is a fourth organic group;
$R^A$—B(OH)$_2$ is a first free organoboronic acid;
X—$R^B$-MIDA is a compound represented by formula IV

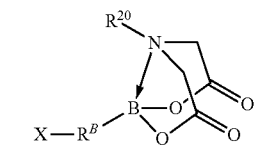

wherein independently for each occurrence
X is a halogen;
$R^B$ is a fifth organic group;
B is identical to B of formula III; and
$R^A$—$R^B$— is $R^{10}$—; and
performing a chemical reaction represented by

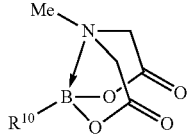

wherein
$R^{10}$—$R^{110}$—B(OH)$_2$ is a second free organoboronic acid.

An aspect of the invention is a method of performing a chemical reaction represented by $R^{10}$-MIDA+$R^{110}$-T$^2$→$R^{110}$—$R^{10}$-MIDA, the method comprising the step of combining a first protected organoboronic acid, represented by $R^{10}$-MIDA, and a second protected organoboronic acid, represented by $R^{110}$-T$^2$, under conditions wherein the rate of hydrolysis of the second protected organoboronic acid is at least about two times greater than the rate of hydrolysis of the first protected organoboronic acid;

whereby at least about 50 percent of $R^{10}$ is chemically transformed before about 10 percent of the boron of the first protected organoboronic acid $R^{10}$-MIDA is transformed;
wherein
$R^{10}$-MIDA is a compound represented by formula III

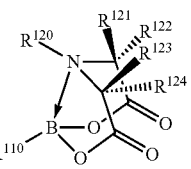

wherein independently for each occurrence
$R^{10}$ is a first organic group;
B is a first boron having sp$^3$ hybridization;
$R^{110}$-T$^2$ is a compound represented by formula II

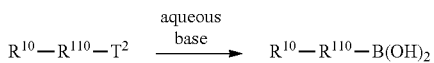

wherein independently for each occurrence
$R^{110}$ is a second organic group;
B is a second boron having sp$^3$ hybridization;
$R^{120}$ is a third organic group;

each of $R^{121}$ and $R^{124}$ is selected from the group consisting of H, alkyl, alkenyl, alkynyl, aryl, heteroaryl, aralkyl, and heteroaralkyl; or $R^{121}$ and $R^{124}$ taken together form a substituted or unsubstituted $C_1$-$C_5$ alkylene or $C_2$-$C_5$ alkenylene bridge between the carbon atoms to which they are attached, wherein any substituent on the $C_1$-$C_5$ alkylene or $C_2$-$C_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms;

each of $R^{122}$ and $R^{123}$ is selected from the group consisting of H, alkyl, alkenyl, alkynyl, aryl, heteroaryl, aralkyl, and heteroaralkyl;

$R^{121}$ and $R^{122}$, together with the carbon atom to which they are attached, may form a substituted or unsubstituted cycloalkyl, heterocycloalkyl, cycloalkenyl, or heterocycloalkenyl group; or $R^{121}$ and $R^{122}$, together with the carbon to which they are attached, may form a substituted or unsubstituted 3- to 6-membered carbocyclic or heterocyclic ring; and $R^{123}$ and $R^{124}$, together with the carbon atom to which they are attached, may form a substituted or unsubstituted cycloalkyl, heterocycloalkyl, cycloalkenyl, or heterocycloalkenyl group; or $R^{123}$ and $R^{124}$, together with the carbon to which they are attached, may form a substituted or unsubstituted 3- to 6-membered carbocyclic or heterocyclic ring;

provided that if (i) $R^{121}$ and $R^{124}$ taken together do not form a substituted or unsubstituted $C_1$-$C_5$ alkylene or $C_2$-$C_5$ alkenylene bridge; and (ii) $R^{121}$ and $R^{122}$, together with the carbon to which they are attached, do not form a substituted or unsubstituted 3- to 6-membered carbocyclic or heterocyclic ring; and (iii) $R^{123}$ and $R^{124}$, together with the carbon to which they are attached, do not form a substituted or unsubstituted 3- to 6-membered carbocyclic or heterocyclic ring, then:

(a) if $R^{120}$ is selected from the group consisting of methyl, isopropyl, 1-phenylethyl, 6,6-dimethylbicyclo[3.1.1]heptan-3-yl, 1-cyclohexylethyl, 2,6,6-trimethylbicyclo[3.1.1]heptan-3-yl, 1-benzyloxy-5-cyclopentyl, 2-(benzyloxy)cyclopentyl, 1,2,3,4-tetrahydronaphthalen-1-yl, 1-(4-methoxyphenyl)ethyl, 3,3-dimethylbutan-2-yl, 1-(naphthalen-1-yl)ethyl, and 1-phenylbutan-2-yl, then at least one of $R^{121}$, $R^{122}$, $R^{123}$, and $R^{124}$ is not H;

(b) if $R^{110}$ is phenyl and $R^{120}$ is methyl and $R^{121}$ is o-, m-, or p-$CH_3C_6H_4CH_2$—, then at least one of $R^{122}$, $R^{123}$, and $R^{124}$ is not H;

(c) if $R^{110}$ is phenyl and $R^{120}$ is methyl and $R^{122}$ is o-, m-, or p-$CH_3C_6H_4CH_2$—, then at least one of $R^{121}$, $R^{123}$, and $R^{124}$ is not H;

(d) if $R^{110}$ is phenyl and $R^{120}$ is benzyl and $R^{121}$ is a radical selected from the group consisting of methyl, ethyl, n-propyl, and n-butyl, then at least one of $R^{122}$, $R^{123}$, and $R^{124}$ is not H; and (e) if $R^{110}$ is phenyl and $R^{120}$ is benzyl and $R^{122}$ is a radical selected from the group consisting of methyl, ethyl, n-propyl, and n-butyl, then at least one of $R^{121}$, $R^{123}$, and $R^{124}$ is not H.

In certain embodiments, the method further comprises performing a chemical reaction represented by $$R^A\text{—}B(OH)_2 + X\text{—}R^B\text{-MIDA} \rightarrow R^{10}\text{-MIDA}$$

wherein independently for each occurrence
$R^A$ is a fourth organic group;
$R^A$—$B(OH)_2$ is a first free organoboronic acid;
X—$R^B$-MIDA is a compound represented by formula IV

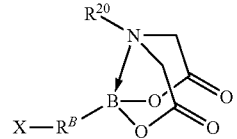

IV wherein independently for each occurrence
X is a halogen;
$R^B$ is a fifth organic group;
B is identical to B of formula III; and
$R^A$—$R^B$— is $R^{10}$—.

In certain embodiments, the method further comprises performing a chemical reaction represented by $$R^{110}\text{—}R^{10}\text{—MIDA} \xrightarrow{\text{aqueous base}} R^{110}\text{—}R^{10}\text{—}B(OH)_2$$

wherein
$R^{110}$—$R^{10}$—$B(OH)_2$ is a second free organoboronic acid.

In certain embodiments, the method further comprises performing a chemical reaction represented by $$R^A\text{—}B(OH)_2 + X\text{—}R^B\text{-MIDA} \rightarrow R^{10}\text{-MIDA}$$

wherein independently for each occurrence
$R^A$ is a fourth organic group;
$R^A$—$B(OH)_2$ is a first free organoboronic acid;
X—$R^B$-MIDA is a compound represented by formula IV

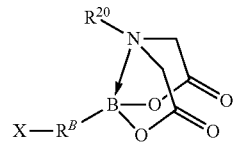

IV wherein independently for each occurrence
X is a halogen;
$R^B$ is a fifth organic group;
B is identical to B of formula III; and
$R^A$—$R^B$— is $R^{10}$—; and
performing a chemical reaction represented by $$R^{110}\text{—}R^{10}\text{—MIDA} \xrightarrow{\text{aqueous base}} R^{110}\text{—}R^{10}\text{—}B(OH)_2$$

wherein
$R^{110}$—$R^{10}$—$B(OH)_2$ is a second free organoboronic acid.

In accordance with any of the foregoing methods, in certain embodiments, the method is performed in a batch process.

In accordance with any of the foregoing methods, in certain embodiments, the method is performed in a flow process.

DETAILED DESCRIPTION OF THE INVENTION

Definitions

Figure 1:
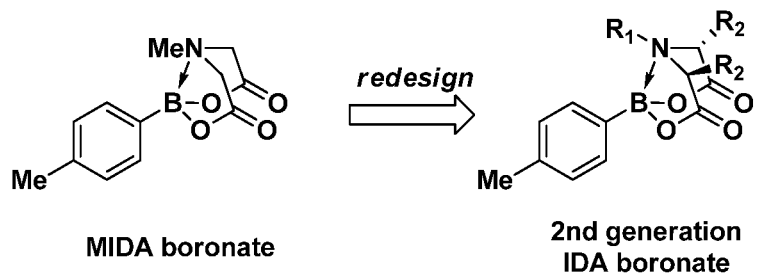
FIG. 1 depicts an example of a MIDA boronate and an iminodiacetic acid (IDA) boronate of the invention.

The following definitions are included to provide a clear and consistent understanding of the specification and claims.

For the purposes of this invention, the chemical elements are identified in accordance with the Periodic Table of the Elements, CAS version, Handbook of Chemistry and Physics, 67th Ed., 1986-1987, inside cover.

The term "organoboronic acid" means a compound represented by $R^1$—$B(OH)_2$, where $R^1$ is an organic group that is bonded to the boron through a boron-carbon bond.

The term "group" means a linked collection of atoms or a single atom within a molecular entity, where a molecular entity is any constitutionally or isotopically distinct atom, molecule, ion, ion pair, radical, radical ion, complex, conformer etc., identifiable as a separately distinguishable entity. The description of a group as being "formed by" a particular chemical transformation does not imply that this chemical transformation is involved in making the molecular entity that includes the group.

The term "organic group" means a group containing at least one carbon atom.

The term "protected organoboronic acid" means a chemical transform of an organoboronic acid, in which the boron has a lower chemical reactivity relative to the original organoboronic acid.

The term "chemical transform" of a substance means a product of a chemical transformation of the substance, where the product has a chemical structure different from that of the substance. A chemical transform of a substance may or may not actually be formed from the substance.

The term "chemical transformation" means the conversion of a substance into a product, irrespective of reagents or mechanisms involved.

The term "$sp^3$ hybridization" means that an atom is bonded and/or coordinated in a configuration having a tetrahedral character of at least 50%. For tetracoordinate boron atoms, the tetrahedral character of the boron atom is calculated by the method of Hopfl, H., *J. Organomet. Chem.* 581: 129-149 (1999). In this method, the tetrahedral character is defined as:

$$THC_{DA}[\%]=100\times[1-(\Sigma_{n=1-6}|109.5-\theta_n|°/90°)]$$

where $\theta_n$ is one of the six bond angles of the boron atom.

The term "protecting group" means an organic group bonded to at least one atom, where the atom has a lower chemical activity than when it is not bonded to the protecting group. For boron-containing compounds, the term excludes non-organic groups used to lower the chemical activity of the boron, such as the $F^-$ and $OH^-$ ligands of —$BF_3$— and —$B(OH)_3^-$.

The term "alkyl group" or "alkyl" means a group formed by removing a hydrogen from a carbon of an alkane, where an alkane is an acyclic or cyclic compound consisting entirely of hydrogen atoms and saturated carbon atoms. In various embodiments, an alkyl contains 1 to 20, 1 to 15, or 1 to 10 carbon atoms. In certain embodiments, an alkyl contains 1 to 6 carbon atoms. In certain embodiments, an alkyl contains 1 to 3 carbon atoms. Non-limiting examples of acyclic alkyl groups include methyl, ethyl, propyl, isopropyl, butanyl, and tert-butanyl. An alkyl group may include one or more substituent groups. The term "cycloalkyl" or "cycloalkyl group" is a subset of alkyl which refers to a cyclic hydrocarbon radical containing from 3 to 15, 3 to 10, or 3 to 7 carbon atoms. Non-limiting examples of cycloalkyl groups include cyclopropyl, cyclobutyl, cyclopentyl, and cyclohexyl. Cycloalkyl groups further include fused cycloalkyl and spiro groups. A cycloalkyl group may include one or more substituent groups.

The term "heteroalkyl group" or "heteroalkyl" means a group formed by removing a hydrogen from a carbon of a heteroalkane, where a heteroalkane is an acyclic or cyclic compound consisting entirely of hydrogen atoms, saturated carbon atoms, and one or more heteroatoms. Non-limiting examples of heteroalkyl groups include pyrrolidyl, piperidinyl, and morpholino. A heteroalkyl group may include one or more substituent groups.

The term "alkenyl group" or "alkenyl" means a group formed by removing a hydrogen from a carbon of an alkene, where an alkene is an acyclic or cyclic compound consisting entirely of hydrogen atoms and carbon atoms, and including at least one carbon-carbon double bond. Non-limiting examples of alkenyl groups include ethylenyl (vinyl), propylenyl, 1-butenyl, 2-butenyl, isobutylenyl, 1-pentenyl, 2-pentenyl, 1-hexenyl, and the like. Non-limiting examples of cycloalkenyl groups include cyclopropenyl, cyclobutenyl, cyclopentenyl, and cyclohexenyl. Cycloalkenyl groups further include fused cycloalkenyl groups. An alkenyl group may include one or more substituent groups.

The term "heteroalkenyl group" or "heteroalkenyl" means a group formed by removing a hydrogen from a carbon of a heteroalkene, where a heteroalkene is an acyclic or cyclic compound consisting entirely of hydrogen atoms, carbon atoms and one or more heteroatoms, and including at least one carbon-carbon double bond. A heteroalkenyl group may include one or more substituent groups.

The term "alkynyl group" or "alkynyl" means a group formed by removing a hydrogen from a carbon of an alkyne, where an alkyne is an acyclic or cyclic compound consisting entirely of hydrogen atoms and carbon atoms, and including at least one carbon-carbon triple bond. An alkynyl group may include one or more substituent groups. Non-limiting examples of alkynyl groups include acetylenyl, propynyl, 1-butynyl, 2-butynyl, isobutynyl, 1-pentynyl, 2-pentynyl, 1-hexynyl, and the like. Non-limiting examples of cycloalkynyl groups include cyclopropynyl, cyclobutynyl, cyclopentynyl, and cyclohexynyl. Cycloalkynyl groups further include fused cycloalkynyl groups.

The term "heteroalkynyl group" or "heteroalkynyl" means a group formed by removing a hydrogen from a carbon of a heteroalkyne, where a heteroalkyne is an acyclic or cyclic compound consisting entirely of hydrogen atoms, carbon atoms and one or more heteroatoms, and including at least one carbon-carbon triple bond. A heteroalkynyl group may include one or more substituent groups.

The term "cyclic" pertains to compounds and/or groups which have one or more rings (e.g., spiro, fused, bridged).

The term "aryl group" or "aryl" means a group formed by removing a hydrogen from a ring carbon atom of an aromatic hydrocarbon. An aryl group may by monocyclic or polycyclic and may include one or more substituent groups. Non-limiting examples of aryl groups include phenyl, naphthalenyl, phenanthrenyl, and anthracenyl.

The term "heteroaryl group" or "heteroaryl" means a group formed by replacing one or more methine (—C=) and/or vinylene (—CH=CH—) groups in an aryl group with a trivalent or divalent heteroatom, respectively. A heteroaryl group may by monocyclic or polycyclic. Non-limiting examples of heteroaryl groups include aminobenzimidazolyl, benzimidazolyl, azaindolyl, benzo(b)thienyl, benzimidazolyl, benzofuranyl, benzoxazolyl, benzothiazolyl, benzothiadiazolyl, benzotriazolyl, benzoxadiazolyl, furanyl, imidazolyl, imidazopyridinyl, indolyl, indolinyl, indazolyl, isoindolinyl, isoxazolyl, isothiazolyl, isoquinolinyl, oxadiazolyl, oxazolyl, purinyl, pyranyl, pyrazinyl, pyrazolyl, pyridinyl, pyrimidinyl, pyrrolyl, pyrrolo[2,3-d]pyrimidinyl, pyrazolo[3,4-d]pyrimidinyl, quinolinyl, quinazolinyl, triazolyl, thiazolyl, thiophenyl, tetrahydroindolyl, tetrazolyl, thiadiazolyl, thienyl, thiomorpholinyl, triazolyl or tropanyl. In certain embodiments, heteroaryl groups include furanyl, imidazolyl, isoquinolinyl, oxazolyl, purinyl, pyrazolyl, pyridinyl, pyrimidinyl, pyrrolyl, quinolinyl, thiazolyl, and thiophenyl. A heteroaryl group may include one or more substituent groups.

The term "heterocyclic group" or "heterocyclic" means a group formed by removing a hydrogen from a carbon of a heterocycle, where a heterocycle is a non-aromatic ring system, including, but not limited to, monocyclic, bicyclic and tricyclic rings, which can be completely saturated or which can contain one or more units of unsaturation, and has 3 to 12 atoms including at least one heteroatom, such as nitrogen, oxygen, or sulfur. For the avoidance of doubt, the degree of unsaturation does not result in an aromatic ring system. A heterocyclic group may include one or more substituent groups. Heterocyclic groups include cyclic heteroalkyl groups, cyclic heteroalkenyl groups, cyclic heteroalkynyl groups, and heteroaryl groups.

The term "substituent" or "substituent group" means a group that replaces one or more hydrogen atoms in a molecular entity. Except as may be specified otherwise, substituent groups can include, without limitation, alkyl, alkenyl, alkynyl, halo, haloalkyl, fluoroalkyl, hydroxy, alkoxy, alkyenyloxy, alkynyloxy, carbocyclyloxy, heterocyclyloxy, haloalkoxy, fluoroalkyloxy, sulfhydryl, alkylthio, haloalkylthio, fluoroalkylthio, alkyenylthio, alkynylthio, sulfonic acid, alkylsulfonyl, haloalkylsulfonyl, fluoroalkylsulfonyl, alkenylsulfonyl, alkynylsulfonyl, alkoxysulfonyl, haloalkoxysulfonyl, fluoroalkoxysulfonyl, alkenyloxysulfonyl, alkynyloxysulfony, aminosulfonyl, sulfinic acid, alkylsulfinyl, haloalkylsulfinyl, fluoroalkylsulfinyl, alkenylsulfinyl, alkynylsulfinyl, alkoxysulfinyl, haloalkoxysulfinyl, fluoroalkoxysulfinyl, alkenyloxysulfinyl, alkynyloxysulfiny, aminosulfinyl, formyl, alkylcarbonyl, haloalkylcarbonyl, fluoroalkylcarbonyl, alkenylcarbonyl, alkynylcarbonyl, carboxyl, alkoxycarbonyl, haloalkoxycarbonyl, fluoroalkoxycarbonyl, alkenyloxycarbonyl, alkynyloxycarbonyl, alkylcarbonyloxy, haloalkylcarbonyloxy, fluoroalkylcarbonyloxy, alkenylcarbonyloxy, alkynylcarbonyloxy, alkylsulfonyloxy, haloalkylsulfonyloxy, fluoroalkylsulfonyloxy, alkenylsulfonyloxy, alkynylsulfonyloxy, haloalkoxysulfonyloxy, fluoroalkoxysulfonyloxy, alkenyloxysulfonyloxy, alkynyloxysulfonyloxy, alkylsulfinyloxy, haloalkylsulfinyloxy, fluoroalkylsulfinyloxy, alkenylsulfinyloxy, alkynylsulfinyloxy, alkoxysulfinyloxy, haloalkoxysulfinyloxy, fluoroalkoxysulfinyloxy, alkenyloxysulfinyloxy, alkynyloxysulfinyloxy, aminosulfinyloxy, amino, amido, aminosulfonyl, aminosulfinyl, cyano, nitro, azido, phosphinyl, phosphoryl, silyl, and silyloxy.

The term "halogen group" or "halogen" means —F, —Cl, —Br, or —I.

The term "organohalide" means an organic compound that includes at least one halogen group.

The term "haloorganoboronic acid" means an organoboronic acid in which the organic group bonded to the boron through a boron-carbon bond includes a halogen group or a pseudohalogen group.

The term "pseudohalogen group" or "pseudohalogen" means a group that has chemical reactivity similar to that of a halogen group. Examples of pseudohalogen groups include triflate (—O—S(=O)$_2$—CF$_3$), methanesulfonate (—O—S(=O)$_2$—CH$_3$), cyanate (—C≡N), azide (—N$_3$), thiocyanate (—N=C=S), thioether (—S—R), anhydride (—C(=O)—O—C(=O)—R), and phenyl selenide (—Se—C$_6$H$_5$).

The term "organo-pseudohalide" means an organic compound that includes at least one pseudohalogen group.

The term "aqueous base" means a material that can donate a hydroxide (OHF) ion into water solution. In certain embodiments, an aqueous base is a strong base, i.e., a base having a pK$_B$ of less than about 1. Examples of bases having a pK$_B$ less than about 1 include NaOH, KOH, LiOH, Mg(OH)$_2$, and Ca(OH)$_2$. In certain embodiments, an aqueous base is a mild base, i.e., a base having a pK$_B$ of at least 1. Examples of bases having a pK$_B$ of at least 1 include bases that include an anion selected from [PO$_4$]$^{3-}$, [C$_6$H$_5$O]$^-$, [CO$_3$]$^{2-}$ and [HCO$_3$]$^{1-}$, such as alkali and alkaline earth salts of these anions. Specific examples of such bases include Li$_3$PO$_4$, Na$_3$PO$_4$, K$_3$PO$_4$, Li$^+$[C$_6$H$_5$O]$^-$, Na$^+$[C$_6$H$_5$O]$^-$, K$^+$[C$_6$H$_5$O]$^-$, Li$_2$CO$_3$, Na$_2$CO$_3$, K$_2$CO$_3$, MgCO$_3$, CaCO$_3$, LiHCO$_3$, NaHCO$_3$, and KHCO$_3$.

The articles "a" and "an" are used herein to refer to one or to more than one (i.e., to at least one) of the grammatical object of the article. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The disclosure illustratively described herein suitably may be practiced in the absence of any element or elements, limitation or limitations which is not specifically disclosed herein.

In the claims, as well as in the specification herein, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It should also be understood that, unless clearly indicated to the contrary, in any methods claimed herein that include more than one step or act, the order of the steps or acts of the method is not necessarily limited to the order in which the steps or acts of the method are recited.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups, i.e., groups from which a proton can be removed (e.g., —COOH) or added (e.g., amines) or which can be quaternized (e.g., amines). All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this disclosure for a given application. In specific applications, the selection of a given anion or cation for preparation of a salt may result in increased or decreased solubility of that salt.

Every formulation or combination of components described or exemplified herein can be used to practice the disclosure, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

Protected Organoboronic Acids

Certain protected organoboronic acid compounds comprising a boron having an $sp^3$ hybridization, a conformationally rigid protecting group bonded to the boron, and an organic group bonded to the boron through a boron-carbon bond; methods of making same; and methods of performing chemical reactions using same are disclosed in U.S. Pat. No. 8,013,203, U.S. Pat. No. 8,318,983, and US 2013/0296573, each to Burke et al., the entire contents of which are incorporated herein by reference. Such compounds are represented generally by the following formula:

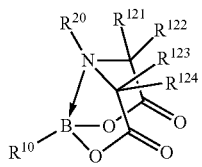

where $R^{10}$ represents the organic group, B represents the boron having $sp^3$ hybridization, and $R^{20}$, $R^{21}$, $R^{22}$, $R^{23}$, and $R^{24}$ independently are selected from the group consisting of a hydrogen group and an organic group.

In an embodiment, the protected organoboronic acid is an N-methyliminodiacetic acid (MIDA) boronate; i.e., $R^{20}$ is methyl, and each of $R^{21}$, $R^{22}$, $R^{23}$, and $R^{24}$ is hydrogen.

Protected organoboronic acids according to the foregoing formula may be prepared by reaction of an appropriate N-substituted imino-di-carboxylic acid with the corresponding unprotected boronic acid, as illustrated in the following reaction scheme:

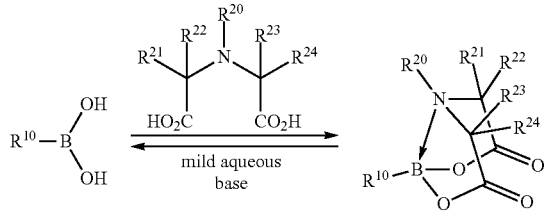

In a specific example, protected organoboronic acids according to the foregoing formula may be prepared by reaction of N-methyliminodiacetic acid (MIDA) with the corresponding unprotected boronic acid, as illustrated in the following reaction scheme:

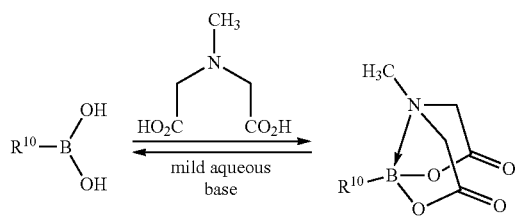

In each case, the protected organoboronic acid may be deprotected by contact with a mild aqueous base, to provide the free boronic acid.

Compounds of the Invention

N-methyliminodiacetic acid (MIDA) boronates have enabled the development of a general and flexible building block-based platform for small molecule synthesis known as iterative cross coupling (ICC). In addition to being used manually by our own and other research groups, the platform has also recently been automated. The development of this platform was enabled by the many unique and useful properties the MIDA ligand imparts upon the corresponding boronates, including lack of reactivity under anhydrous cross coupling conditions. Importantly, MIDA boronates can be deprotected using aqueous NaOH in THF, with reactions usually being completed within 10 minutes. This general sensitivity to aqueous base thus calls for the use of anhydrous Suzuki-Miyaura cross coupling conditions for much of the building block assembly process. However, there are many types of cross couplings that might be better executed under aqueous basic conditions. These include Csp3 couplings and couplings under flow conditions—both of which would substantially advance the scope, utility, and/or efficient automatability of the iterative cross coupling approach. Moreover, while MIDA boronates are stable to many different types of synthetic reagents, thereby enabling many complex boronate building blocks to be constructed from simpler MIDA boronate-containing starting materials, there are some reagents to which MIDA boronates are not stable. It would be advantageous to increase stability of these reagents as well. For all of these reasons, it would be highly advantageous to develop boronates that are more stable than MIDA boronates.

This sensitivity towards aqueous base has also been taken advantage of in the context of slow release cross coupling. Under slow release conditions (mild aqueous base such as $K_3PO_4$), MIDA boronates hydrolyze, but at a much diminished rate relative to normal deprotection conditions (strong aqueous base such as NaOH). This allows for the slow in situ release of unstable and/or sensitive boronic acids, making MIDA boronates useful surrogates for these challenging substrates. In this context, it would be useful in some cases to have this hydrolysis occur faster, to increase the speed of the coupling reaction while still gaining the advantage of the slow-release strategy. Moreover, a faster-reacting boronate might be selectively engaged first, followed by hydrolysis of a MIDA boronate to thereby enable sequential couplings with multiply boronated building blocks. For these reasons, it would also be advantageous to develop boronates that are more reactive than MIDA boronates.

In certain embodiments, the instant invention provides new iminodiacetic acid ligands that are more stable than their MIDA counterparts.

In certain other embodiments, the instant invention provides new iminodiacetic acid ligands that are less stable than their MIDA counterparts.

Several key trends in relation to rate of hydrolysis have been identified in accordance with the invention. First, increasing steric bulk at the nitrogen of the iminodiacetic acid ligand ($R_1$ in FIG. 1) increases rate of hydrolysis of the boronate. While the mechanistic underpinnings of this phenomenon are currently not understood, one possibility is that the increased steric interactions between $R_1$ and the organic group on boron lengthens and weakens the N—B bond, leading to more rapid hydrolysis. Referring to FIG. 1, the relative rate constants (with respect to MIDA, for which $k_{rel}=1$) for the hydrolysis of N-iPr ($R_1=iPr$, $R_2=H$) and N-Cy ($R_1=Cy$, $R_2=H$) derivatives of MIDA were measured to be 4.2 and 6.2, respectively.

Second, again referring to FIG. 1, adding alkyl groups at positions $R_2$ decreases the rate of hydrolysis. Dimethyl-MIDA ($R_1=R_2=Me$ in FIG. 1) was prepared in four steps from commercially available starting materials (Example 1). The $k_{rel}$ for the corresponding boronate was measured to be 0.08, a 12.5-fold reduction in the rate of hydrolysis. The corresponding DiethylMIDA ($R_1=R_2=Et$) was also prepared and tested, showing a $k_{rel}$ of 0.12.

Figure 2:
FIG. 2 depicts possible boronate diastereomers when substituting the iminodiacetic acid backbone.

It should be noted that there are two potential diastereomers of these boronates—one in which both $R_2$ groups are oriented outwards away from the MIDA cage (the "out-out" diastereomer, FIG. 2, left) and one in which one is oriented inwards and the other outwards (the "in-out" diastereomer, FIG. 2, right). Interestingly, when starting with diastereomerically pure boronates, the isomers rapidly interconvert under the hydrolysis conditions to reach a thermodynamically controlled mixture. In the cases of both DimethylMIDA and DiethylMIDA, the equilibrium favored the in-out diastereomer (7.9:1.0 and 2.5:1.0, respectively).

Figure 3:
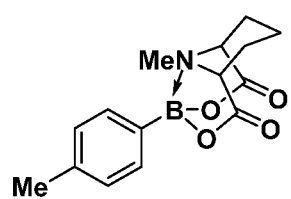
FIG. 3 depicts a stable derivative of a MIDA boronate in which the backbone is tethered into a 6-membered ring.

A related derivative in which the MIDA backbone is tethered into a 6-membered ring (FIG. 3) was also prepared and showed similar rate ($k_{rel}$=0.092, a 10.9-fold reduction in rate of hydrolysis). These results indicate that modification of the MIDA backbone has great potential for slowing the hydrolysis reaction.

Collectively, these results (FIG. 4B) represent an important advance toward the development of tunable iminodiacetic acid (IDA) boronates of selected stability. Surprisingly, steric hindrance at the N of IDA yields less stable derivatives, while steric hindrance at the backbone of IDA yields more stable derivatives.

An aspect of the invention is a compound represented by formula I

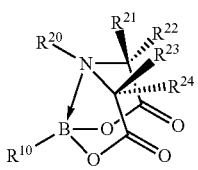

I wherein independently for each occurrence
$R^{10}$ is an organic group;
B is a boron having $sp^3$ hybridization;
$R^{20}$ is an organic group;
each of $R^{21}$ and $R^{24}$ is selected from the group consisting of H, alkyl, alkenyl, alkynyl, aryl, heteroaryl, aralkyl, and heteroaralkyl; or $R^{21}$ and $R^{24}$ taken together form a substituted or unsubstituted $C_1$-$C_5$ alkylene or $C_2$-$C_5$ alkenylene bridge between the carbon atoms to which they are attached, wherein any substituent on the $C_1$-$C_5$ alkylene or $C_2$-$C_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms;
each of $R^{22}$ and $R^{23}$ is selected from the group consisting of H, alkyl, alkenyl, alkynyl, aryl, heteroaryl, aralkyl, and heteroaralkyl;
$R^{21}$ and $R^{22}$, together with the carbon atom to which they are attached, may form a substituted or unsubstituted cycloalkyl, heterocycloalkyl, cycloalkenyl, or heterocycloalkenyl group; or $R^{21}$ and $R^{22}$, together with the carbon to which they are attached, may form a substituted or unsubstituted 3- to 6-membered carbocyclic or heterocyclic ring; and
$R^{23}$ and $R^{24}$, together with the carbon atom to which they are attached, may form a substituted or unsubstituted cycloalkyl, heterocycloalkyl, cycloalkenyl, or heterocycloalkenyl group; or $R^{23}$ and $R^{24}$, together with the carbon to which they are attached, may form a substituted or unsubstituted 3- to 6-membered carbocyclic or heterocyclic ring;

provided that if (i) $R^{21}$ and $R^{24}$ taken together do not form a substituted or unsubstituted $C_1$-$C_5$ alkylene or $C_2$-$C_5$ alkenylene bridge; and (ii) $R^{21}$ and $R^{22}$, together with the carbon to which they are attached, do not form a substituted or unsubstituted 3- to 6-membered carbocyclic or heterocyclic ring; and (iii) $R^{23}$ and $R^{24}$, together with the carbon to which they are attached, do not form a substituted or unsubstituted 3- to 6-membered carbocyclic or heterocyclic ring, then:

(a) if $R^{20}$ is selected from the group consisting of methyl, isopropyl, 1-phenylethyl, 6,6-dimethylbicyclo[3.1.1]heptan-3-yl, 1-cyclohexylethyl, 2,6,6-trimethylbicyclo[3.1.1]heptan-3-yl, 1-benzyloxy-5-cyclopentyl, 2-(benzyloxy)cyclopentyl, 1,2,3,4-tetrahydronaphthalen-1-yl, 1-(4-methoxyphenyl)ethyl, 3,3-dimethylbutan-2-yl, 1-(naphthalen-1-yl)ethyl, and 1-phenylbutan-2-yl, then at least one of $R^{21}$, $R^{22}$, $R^{23}$, and $R^{24}$ is not H;

(b) if $R^{10}$ is phenyl and $R^{20}$ is methyl and $R^{21}$ is o-, m-, or p-$CH_3C_6H_4CH_2$—, then at least one of $R^{22}$, $R^{23}$, and $R^{24}$ is not H;

(c) if $R^{10}$ is phenyl and $R^{20}$ is methyl and $R^{22}$ is o-, m-, or p-$CH_3C_6H_4CH_2$—, then at least one of $R^{21}$, $R^{23}$, and $R^{24}$ is not H;

(d) if $R^{10}$ is phenyl and $R^{20}$ is benzyl and $R^{21}$ is a radical selected from the group consisting of methyl, ethyl, n-propyl, and n-butyl, then at least one of $R^{22}$, $R^{23}$, and $R^{24}$ is not H; and (e) if $R^{10}$ is phenyl and $R^{20}$ is benzyl and $R^{22}$ is a radical selected from the group consisting of methyl, ethyl, n-propyl, and n-butyl, then at least one of $R^{21}$, $R^{23}$, and $R^{24}$ is not H.

In certain embodiments, $R^{10}$ is selected from the group consisting of substituted or unsubstituted alkyl, heteroalkyl, cycloalkyl, heterocycloalkyl, alkenyl, heteroalkenyl, alkynyl, heteroalkynyl, aryl, heteroaryl, aralkyl, and heteroaralkyl.

In certain embodiments, $R^{10}$ is substituted with a halogen.

In certain embodiments, $R^{20}$ is selected from the group consisting of substituted or unsubstituted alkyl, heteroalkyl, cycloalkyl, and heterocycloalkyl. In accordance with these embodiments, any alkyl, heteroalkyl, cycloalkyl, or heterocycloalkyl of $R^{20}$ can be either substituted or unsubstituted.

In certain embodiments, $R^{20}$ is selected from the group consisting of unsubstituted alkyl, heteroalkyl, cycloalkyl, and heterocycloalkyl. In accordance with these embodiments, any alkyl, heteroalkyl, cycloalkyl, or heterocycloalkyl of $R^{20}$ is unsubstituted.

In certain embodiments, $R^{20}$ is selected from the group consisting of substituted alkyl, heteroalkyl, cycloalkyl, and heterocycloalkyl. In accordance with these embodiments, any alkyl, heteroalkyl, cycloalkyl, or heterocycloalkyl of $R^{20}$ is substituted.

In certain embodiments, $R^{20}$ is selected from the group consisting of isopropyl and cyclohexyl.

In certain embodiments, $R^{21}$ and $R^{24}$ are identical.

In certain embodiments where $R^{21}$ and $R^{24}$ are identical, each of $R^{21}$ and $R^{24}$ is H.

In certain other embodiments, $R^{21}$ and $R^{24}$ are not identical.

In certain embodiments, $R^{22}$ and $R^{23}$ are identical.

In certain embodiments where $R^{22}$ and $R^{23}$ are identical, each of $R^{22}$ and $R^{23}$ is H.

In certain embodiments where $R^{22}$ and $R^{23}$ are identical, each of $R^{22}$ and $R^{23}$ is methyl.

In certain embodiments where $R^{22}$ and $R^{23}$ are identical, each of $R^{22}$ and $R^{23}$ is ethyl.

In certain other embodiments, $R^{22}$ and $R^{23}$ are not identical.

In certain embodiments, $R^{21}$ and $R^{22}$ are identical.

In certain embodiments where $R^{21}$ and $R^{22}$ are identical, each of $R^{21}$ and $R^{22}$ is H.

In certain other embodiments, $R^{21}$ and $R^{22}$ are not identical.

In certain embodiments, $R^{23}$ and $R^{24}$ are identical.

In certain embodiments where $R^{23}$ and $R^{24}$ are identical, each of $R^{23}$ and $R^{24}$ is H.

In certain other embodiments, $R^{23}$ and $R^{24}$ are not identical.

In certain embodiments, $R^{21}$ and $R^{24}$ taken together form a substituted or unsubstituted $C_1$-$C_5$ alkylene or $C_2$-$C_5$ alkenylene bridge between the carbon atoms to which they are attached.

In certain embodiments, $R^{21}$ and $R^{24}$ taken together form an unsubstituted $C_1$-$C_5$ alkylene or $C_2$-$C_5$ alkenylene bridge between the carbon atoms to which they are attached.

In certain embodiments, $R^{21}$ and $R^{24}$ taken together form a substituted $C_1$-$C_5$ alkylene or $C_2$-$C_5$ alkenylene bridge between the carbon atoms to which they are attached.

In certain embodiments, $R^{21}$ and $R^{24}$ taken together form a $C_3$ alkylene bridge between the carbon atoms to which they are attached.

In certain embodiments, none of $R^{21}$, $R^{22}$, $R^{23}$, and $R^{24}$ is H.

In certain embodiments, $R^{21}$, $R^{22}$, $R^{23}$, and $R^{24}$ are alkyl.

In certain such embodiments, $R^{21}$, $R^{22}$, $R^{23}$, and $R^{24}$ are methyl.

Methods of the Invention

An aspect of the invention is a method of performing a chemical reaction, comprising combining a compound of the invention and a reagent, whereby $R^{10}$ is chemically transformed, and the boron is not chemically transformed.

An aspect of the invention is a method of performing a chemical reaction, comprising combining a compound of the invention, an organohalide, a palladium catalyst, and an aqueous base, thereby to provide a cross-coupled product, wherein $R^{10}$ has replaced the halide moiety of the organohalide.

An aspect of the invention is a method of performing a first chemical reaction represented by:

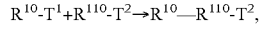

$$R^{10}\text{-}T^1 + R^{110}\text{-}T^2 \rightarrow R^{10}\text{—}R^{110}\text{-}T^2,$$

the method comprising the step of: combining a first protected organoboronic acid, represented by $R^{10}$-$T^1$, and a second protected organoboronic acid, represented by $R^{110}$-$T^2$ under conditions wherein the rate of hydrolysis of the first protected organoboronic acid is at least about five times greater than the rate of hydrolysis of the second protected organoboronic acid;

whereby at least about 50 percent of $R^{110}$ is chemically transformed before about 10 percent of the boron of the second protected organoboronic acid is transformed;

wherein $R^{10}$-$T^1$ is a compound represented by formula I

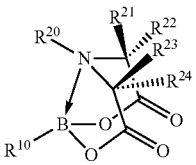

I wherein independently for each occurrence $R^{10}$ is an organic group;

B is a boron having $sp^3$ hybridization;

$R^{20}$ is an organic group;

each of $R^{21}$ and $R^{24}$ is selected from the group consisting of H, alkyl, alkenyl, alkynyl, aryl, heteroaryl, aralkyl, and heteroaralkyl; or $R^{21}$ and $R^{24}$ taken together form a substituted or unsubstituted $C_1$-$C_5$ alkylene or $C_2$-$C_5$ alkenylene bridge between the carbon atoms to which they are attached, wherein any substituent on the $C_1$-$C_5$ alkylene or $C_2$-$C_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms;

each of $R^{22}$ and $R^{23}$ is selected from the group consisting of H, alkyl, alkenyl, alkynyl, aryl, heteroaryl, aralkyl, and heteroaralkyl;

$R^{21}$ and $R^{22}$, together with the carbon atom to which they are attached, may form a substituted or unsubstituted cycloalkyl, heterocycloalkyl, cycloalkenyl, or heterocycloalkenyl group; or $R^{21}$ and $R^{22}$, together with the carbon to which they are attached, may form a substituted or unsubstituted 3- to 6-membered carbocyclic or heterocyclic ring; and $R^{23}$ and $R^{24}$, together with the carbon atom to which they are attached, may form a substituted or unsubstituted cycloalkyl, heterocycloalkyl, cycloalkenyl, or heterocycloalkenyl group; or $R^{23}$ and $R^{24}$, together with the carbon to which they are attached, may form a substituted or unsubstituted 3- to 6-membered carbocyclic or heterocyclic ring;

provided that if (i) $R^{21}$ and $R^{24}$ taken together do not form a substituted or unsubstituted $C_1$-$C_5$ alkylene or $C_2$-$C_5$ alkenylene bridge; and (ii) $R^{21}$ and $R^{22}$, together with the carbon to which they are attached, do not form a substituted or unsubstituted 3- to 6-membered carbocyclic or heterocyclic ring; and (iii) $R^{23}$ and $R^{24}$, together with the carbon to which they are attached, do not form a substituted or unsubstituted 3- to 6-membered carbocyclic or heterocyclic ring, then:

(a) if $R^{20}$ is selected from the group consisting of methyl, isopropyl, 1-phenylethyl, 6,6-dimethylbicyclo[3.1.1]heptan-3-yl, 1-cyclohexylethyl, 2,6,6-trimethylbicyclo[3.1.1]heptan-3-yl, 1-benzyloxy-5-cyclopentyl, 2-(benzyloxy)cyclopentyl, 1,2,3,4-tetrahydronaphthalen-1-yl, 1-(4-methoxyphenyl)ethyl, 3,3-dimethylbutan-2-yl, 1-(naphthalen-1-yl)ethyl, and 1-phenylbutan-2-yl, then at least one of $R^{21}$, $R^{22}$, $R^{23}$, and $R^{24}$ is not H;

(b) if $R^{10}$ is phenyl and $R^{20}$ is methyl and $R^{21}$ is o-, m-, or p-$CH_3C_6H_4CH_2$—, then at least one of $R^{22}$, $R^{23}$, and $R^{24}$ is not H;

(c) if $R^{10}$ is phenyl and $R^{20}$ is methyl and $R^{22}$ is o-, m-, or p-$CH_3C_6H_4CH_2$—, then at least one of $R^{21}$, $R^{23}$, and $R^{24}$ is not H;

(d) if $R^{10}$ is phenyl and $R^{20}$ is benzyl and $R^{21}$ is a radical selected from the group consisting of methyl, ethyl, n-propyl, and n-butyl, then at least one of $R^{22}$, $R^{23}$, and $R^{24}$ is not H; and (e) if $R^{10}$ is phenyl and $R^{20}$ is benzyl and $R^{22}$ is a radical selected from the group consisting of methyl, ethyl, n-propyl, and n-butyl, then at least one of $R^{21}$, $R^{23}$, and $R^{24}$ is not H;

$R^{110}$-$T^2$ is a compound represented by formula II

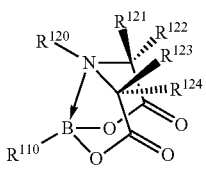

II wherein independently for each occurrence
$R^{110}$ is a third organic group;
B is a second boron having $sp^3$ hybridization;
$R^{120}$ is a fourth organic group;
each of $R^{121}$ and $R^{124}$ is selected from the group consisting of H, alkyl, alkenyl, alkynyl, aryl, heteroaryl, aralkyl, and heteroaralkyl; or $R^{121}$ and $R^{124}$ taken together form a substituted or unsubstituted $C_1$-$C_5$ alkylene or $C_2$-$C_5$ alkenylene bridge between the carbon atoms to which they are attached, wherein any substituent on the $C_1$-$C_5$ alkylene or $C_2$-$C_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms;
each of $R^{122}$ and $R^{123}$ is selected from the group consisting of H, alkyl, alkenyl, alkynyl, aryl, heteroaryl, aralkyl, and heteroaralkyl;
$R^{121}$ and $R^{122}$, together with the carbon atom to which they are attached, may form a substituted or unsubstituted cycloalkyl, heterocycloalkyl, cycloalkenyl, or heterocycloalkenyl group; or $R^{121}$ and $R^{122}$, together with the carbon to which they are attached, may form a substituted or unsubstituted 3- to 6-membered carbocyclic or heterocyclic ring; and
$R^{123}$ and $R^{124}$, together with the carbon atom to which they are attached, may form a substituted or unsubstituted cycloalkyl, heterocycloalkyl, cycloalkenyl, or heterocycloalkenyl group; or $R^{123}$ and $R^{124}$, together with the carbon to which they are attached, may form a substituted or unsubstituted 3- to 6-membered carbocyclic or heterocyclic ring;
provided that if (i) $R^{121}$ and $R^{124}$ taken together do not form a substituted or unsubstituted $C_1$-$C_5$ alkylene or $C_2$-$C_5$ alkenylene bridge; and (ii) $R^{121}$ and $R^{122}$, together with the carbon to which they are attached, do not form a substituted or unsubstituted 3- to 6-membered carbocyclic or heterocyclic ring; and (iii) $R^{123}$ and $R^{124}$, together with the carbon to which they are attached, do not form a substituted or unsubstituted 3- to 6-membered carbocyclic or heterocyclic ring, then:

(a) if $R^{120}$ is selected from the group consisting of methyl, isopropyl, 1-phenylethyl, 6,6-dimethylbicyclo[3.1.1]heptan-3-yl, 1-cyclohexylethyl, 2,6,6-trimethylbicyclo[3.1.1]heptan-3-yl, 1-benzyloxy-5-cyclopentyl, 2-(benzyloxy)cyclopentyl, 1,2,3,4-tetrahydronaphthalen-1-yl, 1-(4-methoxyphenyl)ethyl, 3,3-dimethylbutan-2-yl, 1-(naphthalen-1-yl)ethyl, and 1-phenylbutan-2-yl, then at least one of $R^{121}$, $R^{122}$, $R^{123}$, and $R^{124}$ is not H;

(b) if $R^{110}$ is phenyl and $R^{120}$ is methyl and $R^{121}$ is o-, m-, or p-$CH_3C_6H_4CH_2$—, then at least one of $R^{122}$, $R^{123}$, and $R^{124}$ is not H;

(c) if $R^{110}$ is phenyl and $R^{120}$ is methyl and $R^{122}$ is o-, m-, or p-$CH_3C_6H_4CH_2$—, then at least one of $R^{121}$, $R^{123}$, and $R^{124}$ is not H;

(d) if $R^{110}$ is phenyl and $R^{120}$ is benzyl and $R^{121}$ is a radical selected from the group consisting of methyl, ethyl, n-propyl, and n-butyl, then at least one of $R^{122}$, $R^{123}$, and $R^{124}$ is not H; and (e) if $R^{110}$ is phenyl and $R^{120}$ is benzyl and $R^{122}$ is a radical selected from the group consisting of methyl, ethyl, n-propyl, and n-butyl, then at least one of $R^{121}$, $R^{123}$, and $R^{124}$ is not H.

In certain embodiments, the rate of hydrolysis of the first protected organoboronic acid is at least about nine times greater than the rate of hydrolysis of the second protected organoboronic acid.

In certain embodiments, the method just described further comprises a second chemical reaction whereby $R^{10}$-$T^1$ is provided, the second chemical reaction represented by

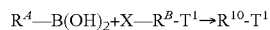

wherein independently for each occurrence
$R^A$ is a fifth organic group;
$R^A$—$B(OH)_2$ is a first free organoboronic acid;
$X$—$R^B$-$T^1$ is a compound represented by formula III

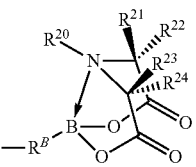

III wherein independently for each occurrence
X is a halogen;
$R^B$ is a sixth organic group;
B, $R^{20}$, $R^{21}$, $R^{22}$, $R^{23}$, and $R^{24}$ are identical to B, $R^{20}$, $R^{21}$, $R^{22}$, $R^{23}$, and $R^{24}$ of formula I; and $R^A$—$R^B$— is $R^{10}$—.

In certain embodiments, the method further comprises a third chemical reaction whereby a second free organoboronic acid $R^{10}$—$R^{110}$—$B(OH)_2$ is formed, the third chemical reaction represented by

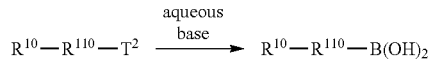

wherein
$R^{10}$—$R^{110}$—$B(OH)_2$ is a second free organoboronic acid.

In certain embodiments, the method further comprises both
(i) a second chemical reaction whereby $R^{10}$-$T^1$ is provided, the second chemical reaction represented by

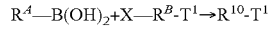

wherein independently for each occurrence
$R^A$ is a fifth organic group;
$R^A$—$B(OH)_2$ is a first free organoboronic acid;

X—$R^B$-$T^1$ is a compound represented by formula III

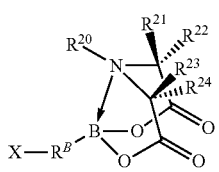

wherein independently for each occurrence

X is a halogen;

$R^B$ is a sixth organic group;

B, $R^{20}$, $R^{21}$, $R^{22}$, $R^{23}$, and $R^{24}$ are identical to B, $R^{20}$, $R^{21}$, $R^{22}$, $R^{23}$, and $R^{24}$ of formula I; and $R^A$—$R^B$— is $R^{10}$—;

and (ii) a third chemical reaction whereby a second free organoboronic acid $R^{10}$—$R^{110}$—B(OH)$_2$ is formed, the third chemical reaction represented by

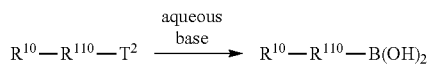

wherein $R^{10}$—$R^{110}$—B(OH)$_2$ is a second free organoboronic acid.

An aspect of the invention is a method of performing a chemical reaction represented by

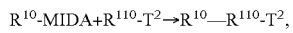

the method comprising the step of: combining a first protected organoboronic acid, represented by $R^{10}$-MIDA, and a second protected organoboronic acid, represented by $R^{110}$-$T^2$, under conditions wherein the rate of hydrolysis of the first protected organoboronic acid is at least about two times greater than the rate of hydrolysis of the second protected organoboronic acid, whereby at least about 50 percent of $R^{110}$ is chemically transformed before about 10 percent of the boron of the second protected organoboronic acid $R^{110}$-$T^2$ is transformed;

wherein $R^{10}$-MIDA is a compound represented by formula III

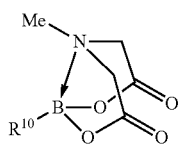

wherein independently for each occurrence $R^{10}$ is a first organic group;

B is a first boron having sp$^3$ hybridization;

$R^{110}$-$T^2$ is a compound represented by formula II

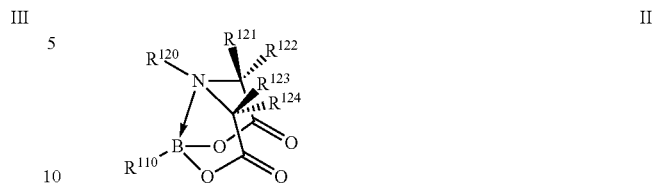

wherein independently for each occurrence $R^{110}$ is a second organic group;

B is a second boron having sp$^3$ hybridization;

$R^{120}$ is a third organic group;

each of $R^{121}$ and $R^{124}$ is selected from the group consisting of H, alkyl, alkenyl, alkynyl, aryl, heteroaryl, aralkyl, and heteroaralkyl; or $R^{121}$ and $R^{124}$ taken together form a substituted or unsubstituted $C_1$-$C_5$ alkylene or $C_2$-$C_5$ alkenylene bridge between the carbon atoms to which they are attached, wherein any substituent on the $C_1$-$C_5$ alkylene or $C_2$-$C_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms;

each of $R^{122}$ and $R^{123}$ is selected from the group consisting of H, alkyl, alkenyl, alkynyl, aryl, heteroaryl, aralkyl, and heteroaralkyl;

$R^{121}$ and $R^{122}$, together with the carbon atom to which they are attached, may form a substituted or unsubstituted cycloalkyl, heterocycloalkyl, cycloalkenyl, or heterocycloalkenyl group; or $R^{121}$ and $R^{122}$, together with the carbon to which they are attached, may form a substituted or unsubstituted 3- to 6-membered carbocyclic or heterocyclic ring; and $R^{123}$ and $R^{124}$, together with the carbon atom to which they are attached, may form a substituted or unsubstituted cycloalkyl, heterocycloalkyl, cycloalkenyl, or heterocycloalkenyl group; or $R^{123}$ and $R^{124}$, together with the carbon to which they are attached, may form a substituted or unsubstituted 3- to 6-membered carbocyclic or heterocyclic ring;

provided that if (i) $R^{121}$ and $R^{124}$ taken together do not form a substituted or unsubstituted $C_1$-$C_5$ alkylene or $C_2$-$C_5$ alkenylene bridge; and (ii) $R^{121}$ and $R^{122}$, together with the carbon to which they are attached, do not form a substituted or unsubstituted 3- to 6-membered carbocyclic or heterocyclic ring; and (iii) $R^{123}$ and $R^{124}$, together with the carbon to which they are attached, do not form a substituted or unsubstituted 3- to 6-membered carbocyclic or heterocyclic ring, then:

(a) if $R^{120}$ is selected from the group consisting of methyl, isopropyl, 1-phenylethyl, 6,6-dimethylbicyclo[3.1.1]heptan-3-yl, 1-cyclohexylethyl, 2,6,6-trimethylbicyclo[3.1.1]heptan-3-yl, 1-benzyloxy-5-cyclopentyl, 2-(benzyloxy)cyclopentyl, 1,2,3,4-tetrahydronaphthalen-1-yl, 1-(4-methoxyphenyl)ethyl, 3,3-dimethylbutan-2-yl, 1-(naphthalen-1-yl)ethyl, and 1-phenylbutan-2-yl, then at least one of $R^{121}$, $R^{122}$, $R^{123}$, and $R^{124}$ is not H;

(b) if $R^{110}$ is phenyl and $R^{120}$ is methyl and $R^{121}$ is o-, m-, or p-CH$_3$C$_6$H$_4$CH$_2$—, then at least one of $R^{122}$, $R^{123}$, and $R^{124}$ is not H;

(c) if $R^{110}$ is phenyl and $R^{120}$ is methyl and $R^{122}$ is o-, m-, or p-CH$_3$C$_6$H$_4$CH$_2$—, then at least one of $R^{121}$, $R^{123}$, and $R^{124}$ is not H;

(d) if $R^{110}$ is phenyl and $R^{120}$ is benzyl and $R^{121}$ is a radical selected from the group consisting of methyl, ethyl, n-propyl, and n-butyl, then at least one of $R^{122}$, $R^{123}$, and $R^{124}$ is not H; and (e) if $R^{110}$ is phenyl and $R^{120}$ is benzyl and $R^{122}$ is a radical selected from the group consisting of methyl, ethyl, n-propyl, and n-butyl, then at least one of $R^{121}$, $R^{123}$, and $R^{124}$ is not H.

In certain embodiments, the rate of hydrolysis of the first protected organoboronic acid is at least about five times greater than the rate of hydrolysis of the second protected organoboronic acid.

In certain embodiments, the method just described further comprises a second chemical reaction whereby $R^{10}$-MIDA is provided, the second chemical reaction represented by

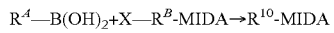

wherein independently for each occurrence
$R^A$ is a fourth organic group;
$R^A$—B(OH)$_2$ is a first free organoboronic acid;
X—$R^B$-MIDA is a compound represented by formula IV

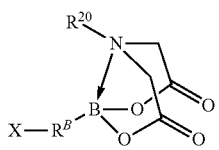

IV wherein independently for each occurrence
X is a halogen;
$R^B$ is a fifth organic group;
B is identical to B of formula III; and
$R^A$—$R^B$— is $R^{10}$—.

In certain embodiments, the method further comprises a third chemical reaction whereby a second free organoboronic acid represented by $R^{10}$—$R^{110}$—B(OH)$_2$ is formed, the third chemical reaction represented by

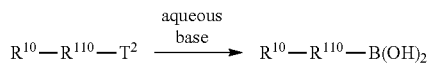

wherein
$R^{10}$—$R^{110}$—B(OH)$_2$ is a second free organoboronic acid.

In certain embodiments, the method further comprises both (i) a second chemical reaction whereby $R^{10}$-MIDA is provided, the second chemical reaction represented by

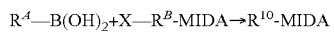

wherein independently for each occurrence
$R^A$ is a fourth organic group;
$R^A$—B(OH)$_2$ is a first free organoboronic acid;
X—$R^B$-MIDA is a compound represented by formula IV

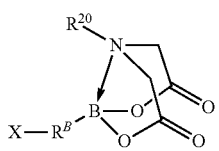

IV wherein independently for each occurrence
X is a halogen;
$R^B$ is a fifth organic group;
B is identical to B of formula III; and
$R^A$—$R^B$— is $R^{10}$—;
and (ii) a third chemical reaction whereby a second free organoboronic acid represented by $R^{10}$—$R^{110}$—B(OH)$_2$ is formed, the third chemical reaction represented by

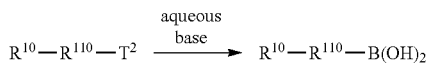

wherein
$R^{10}$—$R^{110}$—B(OH)$_2$ is a second free organoboronic acid.

An aspect of the invention is a method of performing a chemical reaction represented by $$R^{10}\text{-MIDA} + R^{110}\text{-}T^2 \rightarrow R^{110}\text{—}R^{10}\text{-MIDA},$$

the method comprising the step of combining a first protected organoboronic acid, represented by $R^{10}$-MIDA, and a second protected organoboronic acid, represented by $R^{110}$-$T^2$, under conditions wherein the rate of hydrolysis of the second protected organoboronic acid is at least about two times greater than the rate of hydrolysis of the first protected organoboronic acid;

whereby at least about 50 percent of $R^{10}$ is chemically transformed before about 10 percent of the boron of the first protected organoboronic acid $R^{10}$-MIDA is transformed;
wherein
$R^{10}$-MIDA is a compound represented by formula III

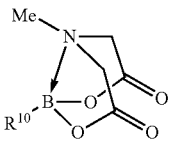

III wherein independently for each occurrence
$R^{10}$ is a first organic group;
B is a first boron having sp$^3$ hybridization;
$R^{110}$-$T^2$ is a compound represented by formula II

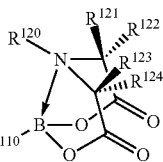

II wherein independently for each occurrence
$R^{110}$ is a second organic group;
B is a second boron having sp$^3$ hybridization;
$R^{120}$ is a third organic group;
each of $R^{121}$ and $R^{124}$ is selected from the group consisting of H, alkyl, alkenyl, alkynyl, aryl, heteroaryl, aralkyl, and heteroaralkyl; or $R^{121}$ and $R^{124}$ taken together form a substituted or unsubstituted $C_1$-$C_5$ alkylene or $C_2$-$C_5$ alkenylene bridge between the carbon atoms to which they are attached, wherein any substituent on the $C_1$-$C_5$ alkylene or $C_2$-$C_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms;

each of $R^{122}$ and $R^{123}$ is selected from the group consisting of H, alkyl, alkenyl, alkynyl, aryl, heteroaryl, aralkyl, and heteroaralkyl;

$R^{121}$ and $R^{122}$, together with the carbon atom to which they are attached, may form a substituted or unsubstituted cycloalkyl, heterocycloalkyl, cycloalkenyl, or heterocycloalkenyl group; or $R^{121}$ and $R^{122}$, together with the carbon to which they are attached, may form a substituted or unsubstituted 3- to 6-membered carbocyclic or heterocyclic ring; and $R^{123}$ and $R^{124}$, together with the carbon atom to which they are attached, may form a substituted or unsubstituted cycloalkyl, heterocycloalkyl, cycloalkenyl, or heterocycloalkenyl group; or $R^{123}$ and $R^{124}$, together with the carbon to which they are attached, may form a substituted or unsubstituted 3- to 6-membered carbocyclic or heterocyclic ring;

provided that if (i) $R^{121}$ and $R^{124}$ taken together do not form a substituted or unsubstituted $C_1$-$C_5$ alkylene or $C_2$-$C_5$ alkenylene bridge; and (ii) $R^{121}$ and $R^{122}$, together with the carbon to which they are attached, do not form a substituted or unsubstituted 3- to 6-membered carbocyclic or heterocyclic ring; and (iii) $R^{123}$ and $R^{124}$, together with the carbon to which they are attached, do not form a substituted or unsubstituted 3- to 6-membered carbocyclic or heterocyclic ring, then:

(a) if $R^{120}$ is selected from the group consisting of methyl, isopropyl, 1-phenylethyl, 6,6-dimethylbicyclo[3.1.1]heptan-3-yl, 1-cyclohexylethyl, 2,6,6-trimethylbicyclo[3.1.1]heptan-3-yl, 1-benzyloxy-5-cyclopentyl, 2-(benzyloxy)cyclopentyl, 1,2,3,4-tetrahydronaphthalen-1-yl, 1-(4-methoxyphenyl)ethyl, 3,3-dimethylbutan-2-yl, 1-(naphthalen-1-yl)ethyl, and 1-phenylbutan-2-yl, then at least one of $R^{121}$, $R^{122}$, $R^{123}$, and $R^{124}$ is not H;

(b) if $R^{110}$ is phenyl and $R^{120}$ is methyl and $R^{121}$ is o-, m-, or p-$CH_3C_6H_4CH_2$—, then at least one of $R^{122}$, $R^{123}$, and $R^{124}$ is not H;

(c) if $R^{110}$ is phenyl and $R^{120}$ is methyl and $R^{122}$ is o-, m-, or p-$CH_3C_6H_4CH_2$—, then at least one of $R^{121}$, $R^{123}$, and $R^{124}$ is not H;

(d) if $R^{110}$ is phenyl and $R^{120}$ is benzyl and $R^{121}$ is a radical selected from the group consisting of methyl, ethyl, n-propyl, and n-butyl, then at least one of $R^{122}$, $R^{123}$, and $R^{124}$ is not H; and (e) if $R^{110}$ is phenyl and $R^{120}$ is benzyl and $R^{122}$ is a radical selected from the group consisting of methyl, ethyl, n-propyl, and n-butyl, then at least one of $R^{121}$, $R^{123}$, and $R^{124}$ is not H.

In certain embodiments, the rate of hydrolysis of the second protected organoboronic acid is at least about five times greater than the rate of hydrolysis of the first protected organoboronic acid.

In certain embodiments, the method just described further comprises a second chemical reaction whereby $R^{10}$-MIDA is provided, the second chemical reaction represented by

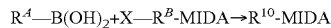

wherein independently for each occurrence
$R^A$ is a fourth organic group;
$R^A$—$B(OH)_2$ is a first free organoboronic acid;
X—$R^B$-MIDA is a compound represented by formula IV

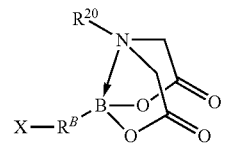

wherein independently for each occurrence
X is a halogen;
$R^B$ is a fifth organic group;
B is identical to B of formula III; and
$R^A$—$R^B$— is $R^{10}$—.

In certain embodiments, the method further comprises a third chemical reaction whereby a second free organoboronic acid represented by $R^{110}$—$R^{10}$—$B(OH)_2$ is formed, the third chemical reaction represented by

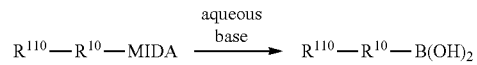

wherein
$R^{110}$—$R^{10}$—$B(OH)_2$ is a second free organoboronic acid.

In certain embodiments, the method further comprises both (i) a second chemical reaction whereby $R^{10}$-MIDA is provided, the second chemical reaction represented by

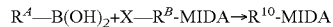

wherein independently for each occurrence
$R^A$ is a fourth organic group;
$R^A$—$B(OH)_2$ is a first free organoboronic acid;
X—$R^B$-MIDA is a compound represented by formula IV

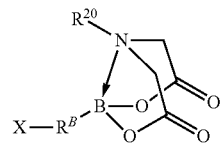

wherein independently for each occurrence
X is a halogen;
$R^B$ is a fifth organic group;
B is identical to B of formula III; and
$R^A$—$R^B$— is $R^{10}$—;
and (ii) a third chemical reaction whereby a second free organoboronic acid represented by $R^{110}$—$R^{10}$—$B(OH)_2$ is formed, the third chemical reaction represented by

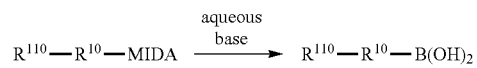

wherein
$R^{110}$—$R^{10}$—$B(OH)_2$ is a second free organoboronic acid.

In accordance with each of the methods and embodiments above, in certain embodiments, at least a portion of the method is performed in a batch process.

In accordance with each of the methods and embodiments above, in certain embodiments, the entirety of the method is performed in a batch process.

In accordance with each of the methods and embodiments above, in certain embodiments, at least a portion of the method is performed in a flow process.

In accordance with each of the methods and embodiments above, in certain embodiments, the entirety of the method is performed in a flow process.

In batch process chemistry, a chemical reaction is run in a single pot or is run serially, e.g., as a series of single-pot reactions. In certain embodiments, the batch process is performed on laboratory scale. In certain embodiments, the batch process is performed on pilot scale. In certain embodiments, the batch process is performed on process scale.

In flow process chemistry, a chemical reaction is run in a continuously flowing stream or is run in parallel rather than in batch production. In other words, pumps move fluid into a tube, and where tubes join one another, the fluids contact one another. If these fluids are reactive, a reaction takes place. Flow chemistry is a well-established technique for use at a large scale when manufacturing large quantities of a given material. In certain embodiments, flow is continuous. In certain embodiments, flow is non-continuous, e.g., flow is segmented. In certain embodiments, the flow chemistry is performed on a micro- or nano-scale, e.g., using a microfluidic device. In certain embodiments, the flow chemistry is performed on a laboratory scale. In certain embodiments, the flow chemistry is performed on a pilot scale. In certain embodiments, the flow chemistry is performed on a process scale. In certain embodiments, the flow chemistry is performed in an automated fashion, e.g., using a synthesizer such as is described in U.S. Patent Application Publication No. US 2013/0243670 to Burke et al., the entire contents of which is incorporated herein by reference. Additional examples of flow process chemistry and related devices for performing same include U.S. Pat. No. 5,316,728 to Hayashi et al.; U.S. Pat. No. 5,499,193 to Sugawara et al.; U.S. Pat. No. 7,730,904 to Gilligan et al.; U.S. Pat. No. 7,858,048 to Gilligan et al.; and U.S. Pat. No. 8,734,736 to Ludwig; the entire contents of each of which is incorporated herein by reference.

Having now described the present invention in detail, the same will be more clearly understood by reference to the following examples, which are included herewith for purposes of illustration only and are not intended to be limiting of the invention.

EXAMPLES

Example 1: Synthesis of DimethylMIDA

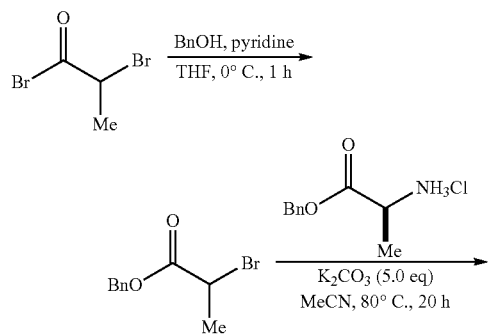

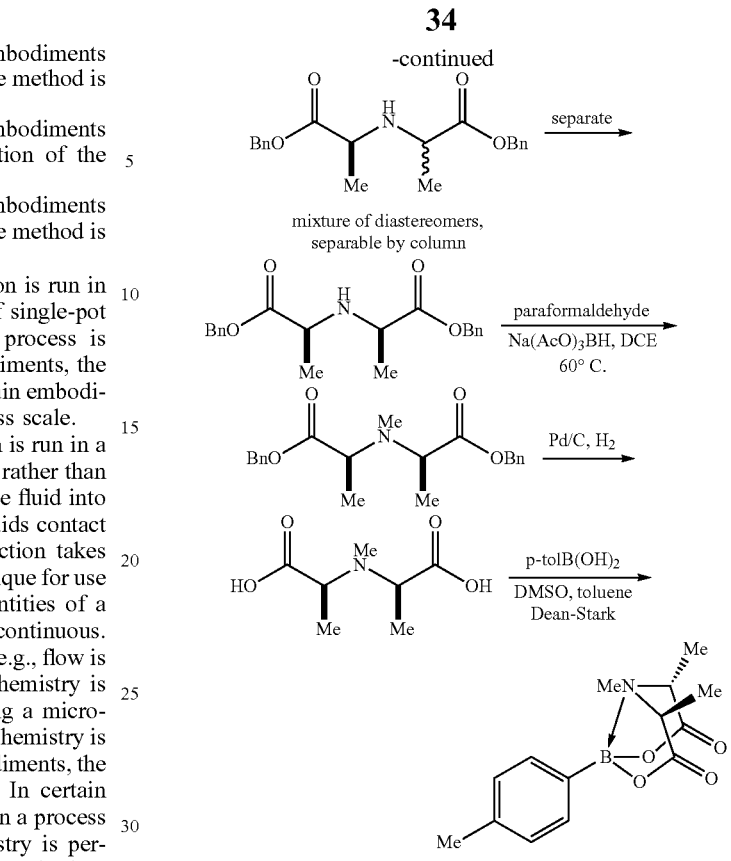

Example 2: Hydrolysis of MIDA Boronate and Derivatives Thereof

Figure 4A:
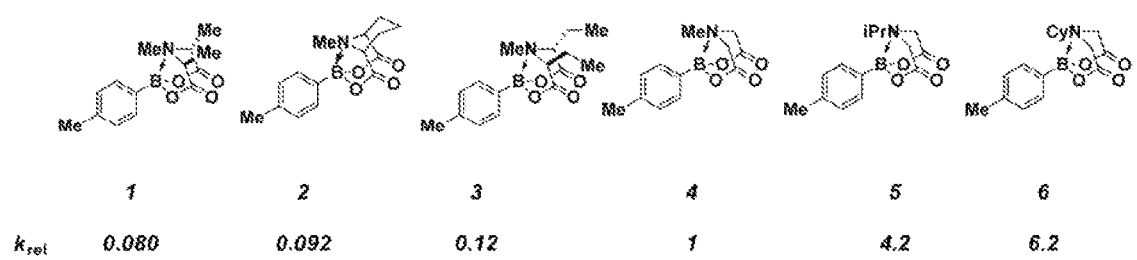
FIG. 4A depicts a MIDA boronate (compound 4) and five derivatives thereof. $k_{rel}$=rate constant for hydrolysis relative to that of compound 4.
Figure 4B:
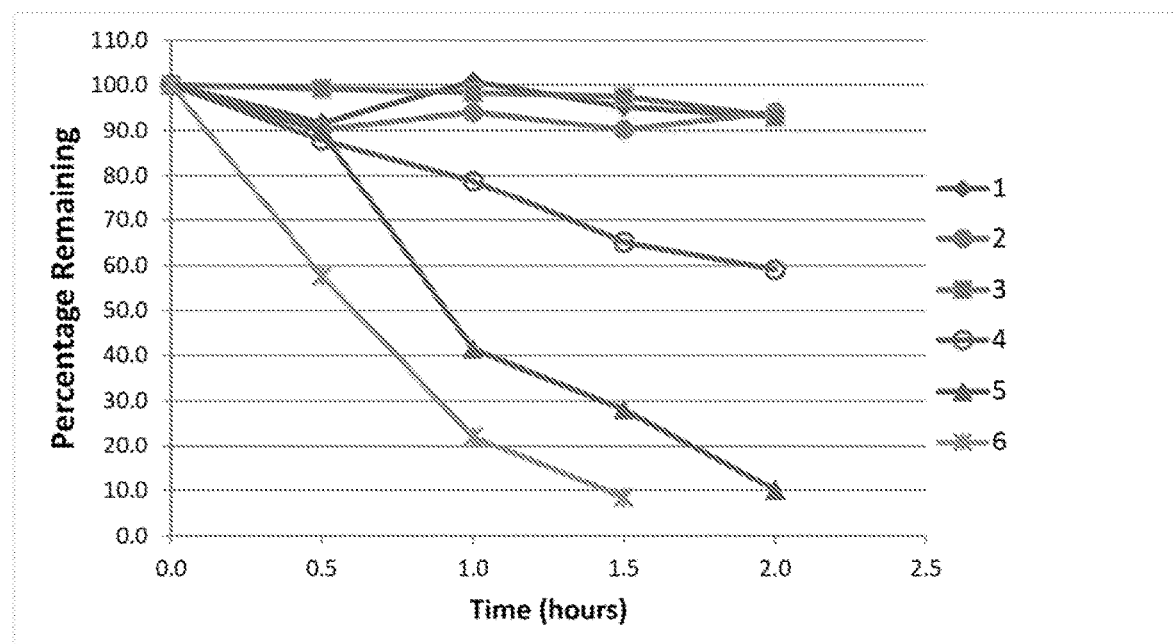
FIG. 4B is a graph depicting reaction profile for the hydrolysis of a MIDA boronate (compound 4) and five derivatives thereof depicted in FIG. 4A.

Compounds 1-6 (FIG. 4A) were prepared and then characterized in terms of their rates of hydrolysis under defined conditions relative to MIDA compound 4. Reaction conditions were: 5:1 THF-$d_8$:$D_2O$, 0.07 M in boronate, 7.5 eq. $K_3PO_4$, 60° C. Reactions were stirred for 0.5 to 2.0 h before being cooled and diluted with DMSO-$d_6$ containing 1,4-dimethoxybenzene as an internal standard. $^1$H NMR was taken immediately to determine % boronate remaining. Results are shown in FIG. 4B. For compounds 1, 2, and 3, n=2 and the average between the two runs is represented in the figure.

Figure 5:
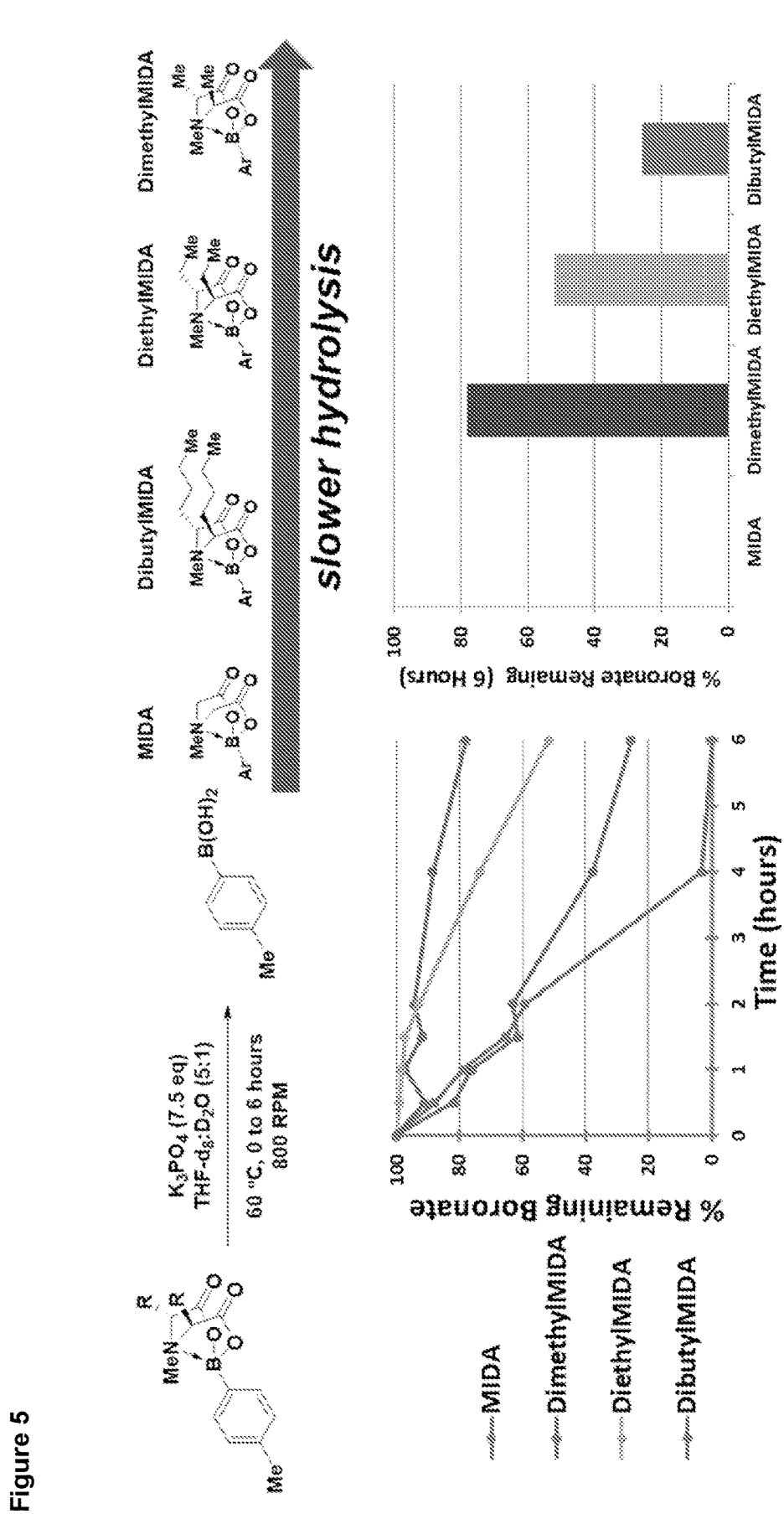
FIG. 5 depicts a series of MIDA boronates and their relative rates of hydrolysis.
Figure 6:
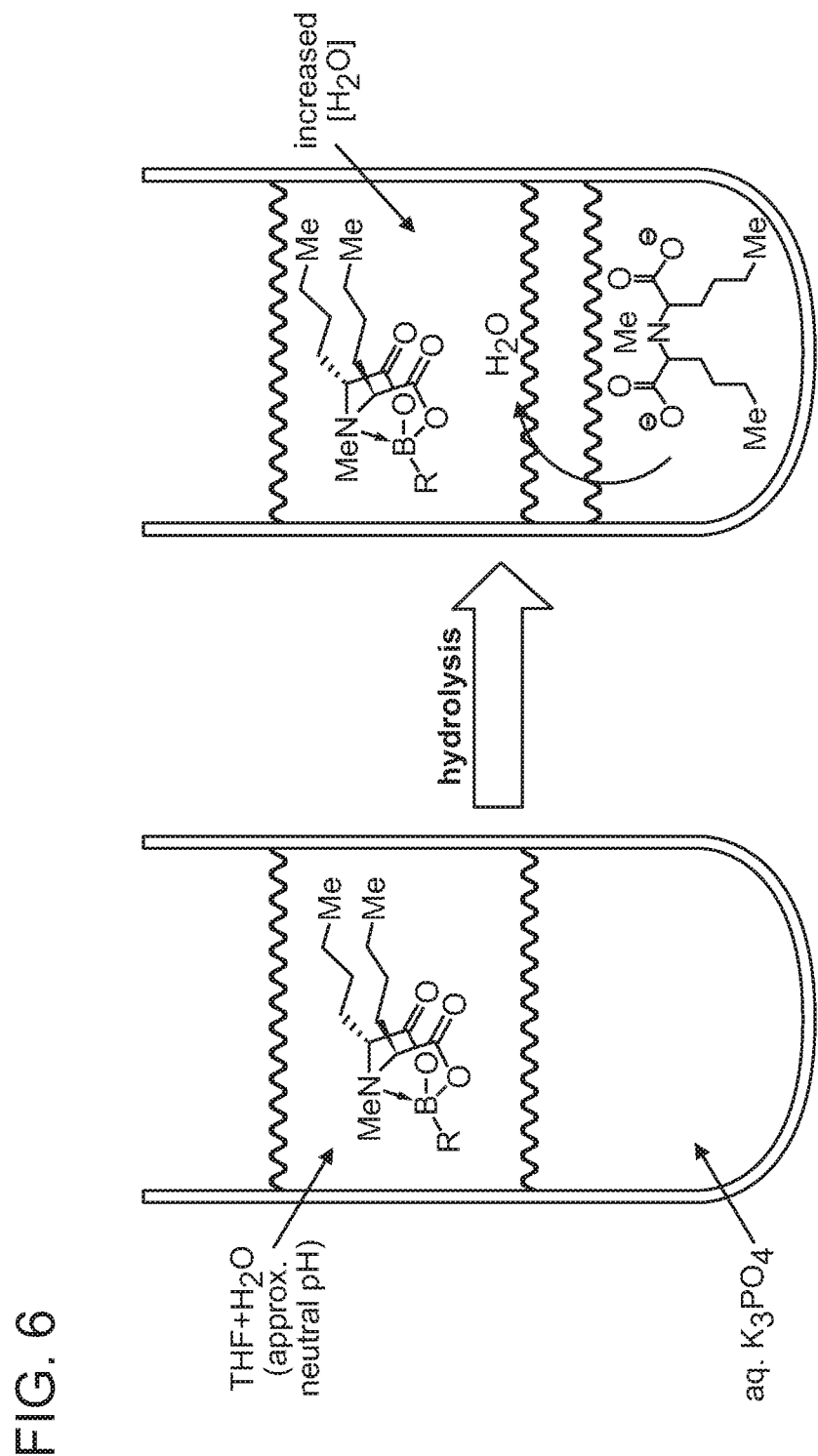
FIG. 6 depicts the phases in which MIDA hydrolysis occurs.
Figure 7:
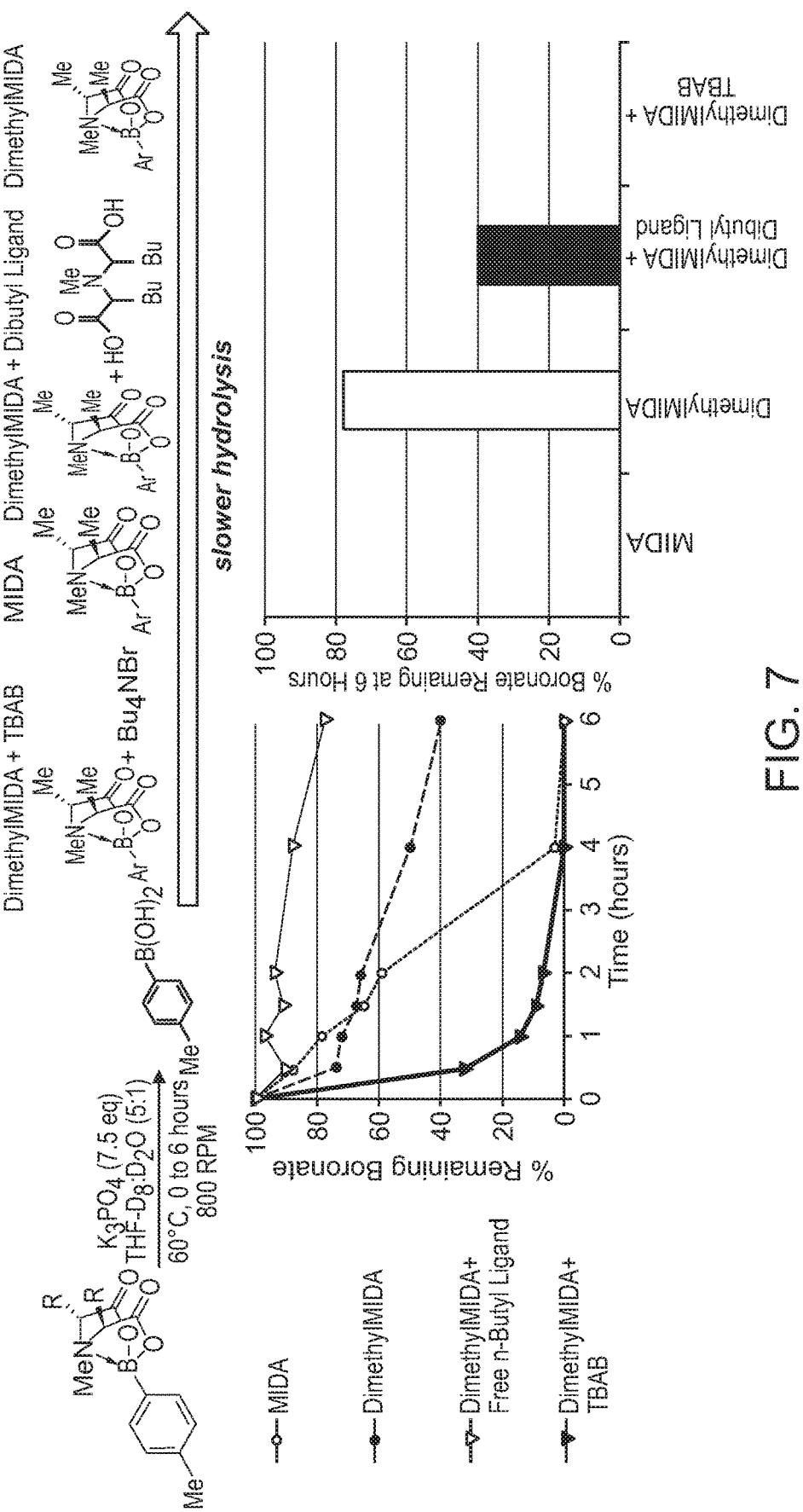
FIG. 7 depicts the relative rates of hydrolysis of MIDA boronates in the presence of or absence of a phase transfer catalyst (PTC).

Example 3: Further Studies Relating to Hydrolysis of MIDA Boronate and Derivatives Thereof Several additional α-substituted MIDA derivatives was prepared, with R=Me, Et, and nBu (FIG. 5). Levels of conversion were measured at time points from 0 to 6 hours. An interesting trend was observed-as the length of the alkyl chain appended to the backbone increased, the rate of hydrolysis under slow release conditions also increased. With R=Me, nearly 80% of the boronate remained at 6 hours; with R=nBu, only about 25% remained. This result may seem counterintuitive until the mechanism of MIDA boronate hydrolysis is considered. Lloyd-Jones and coworkers recently showed that when ethereal solutions of MIDA boronates are treated with aqueous solutions of weak base, the hydrolysis of the boronate is mediated by neutral water in the organic layer; thus, as the concentration/activity of the water in the organic layer increases, so does the rate of hydrolysis. The current hypothesis is that as the hydrolysis reaction proceeds, free ligand is released into solution and begins to act as a phase transfer catalyst (PTC), increasing [H$_2$O] in the organic layer (FIG. 6). The ligands with the longer, more lipophilic alkyl chains would theoretically act as better PTCs, and should therefore lead to faster hydrolysis, consistent with the data presented herein. This hypothesis was further supported by experiments in which either free dibutyl ligand or the known PTC tetrabutylammonium bromide was added to the hydrolysis of a dimethylMIDA boronate—in both of these cases, the boronate hydrolyzed faster than the lone boronate (FIG. 7).

Example 4: Hydrolysis of Peralkylated MIDA Boronates

Figure 8:
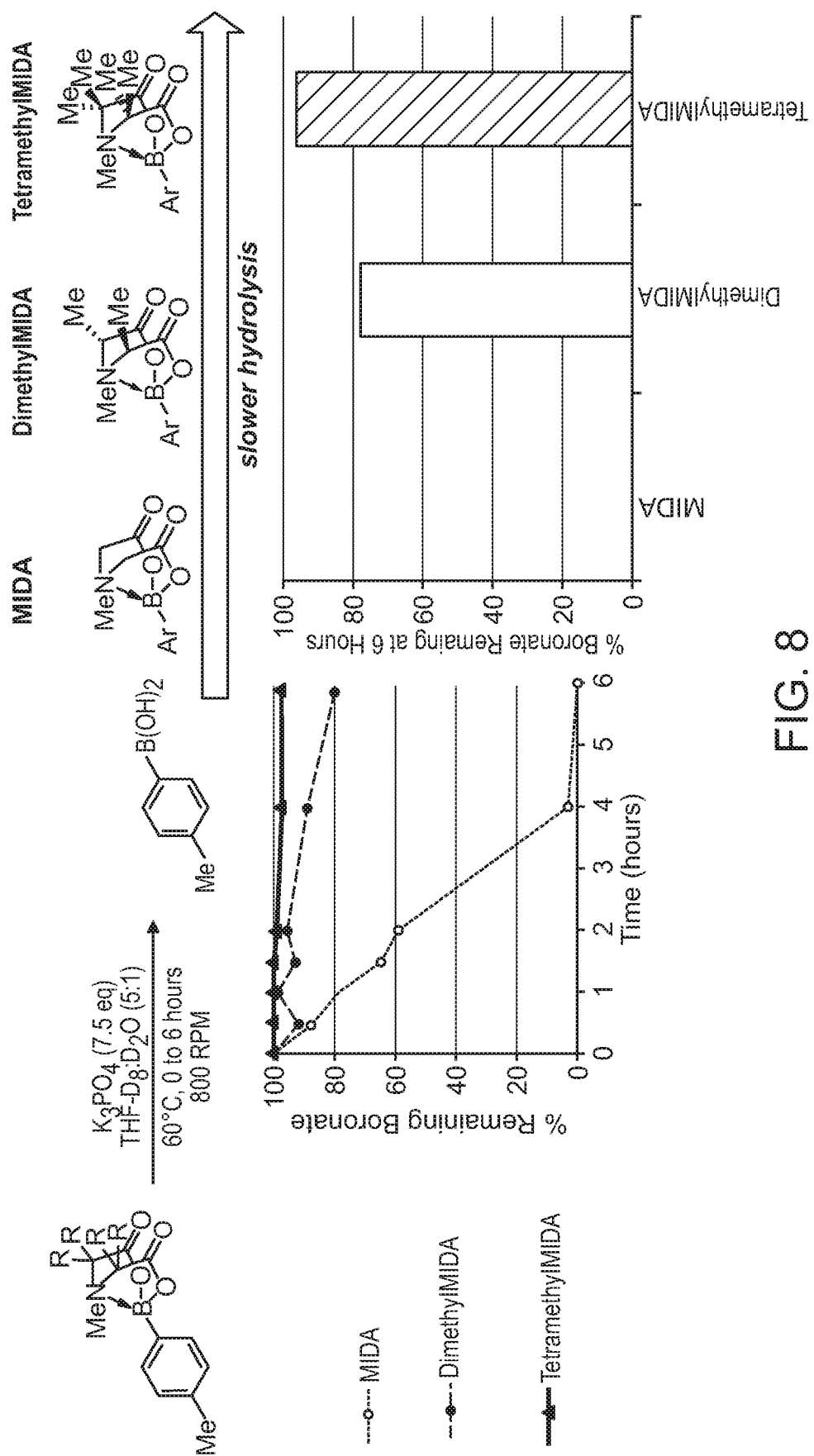
FIG. 8 depicts the relative rates of hydrolysis of a MIDA boronate, a dialkylated MIDA boronate, and a peralkylated MIDA boronate (TIDA boronate).

All of the alpha substituted derivatives discussed above had the two alkyl substituents on the MIDA backbone. The effects of peralkylating the backbone were investigated next. A MIDA derivative was preparing, having all four of the backbone protons replaced with methyl groups, tetramethylMIDA (TIDA). The resulting TIDA boronates hydrolyze much slower than any of the other derivatives tested above—after 6 hours under slow release hydrolysis like conditions, over 95% of the boronate remained (FIG. 8).

Figure 9:
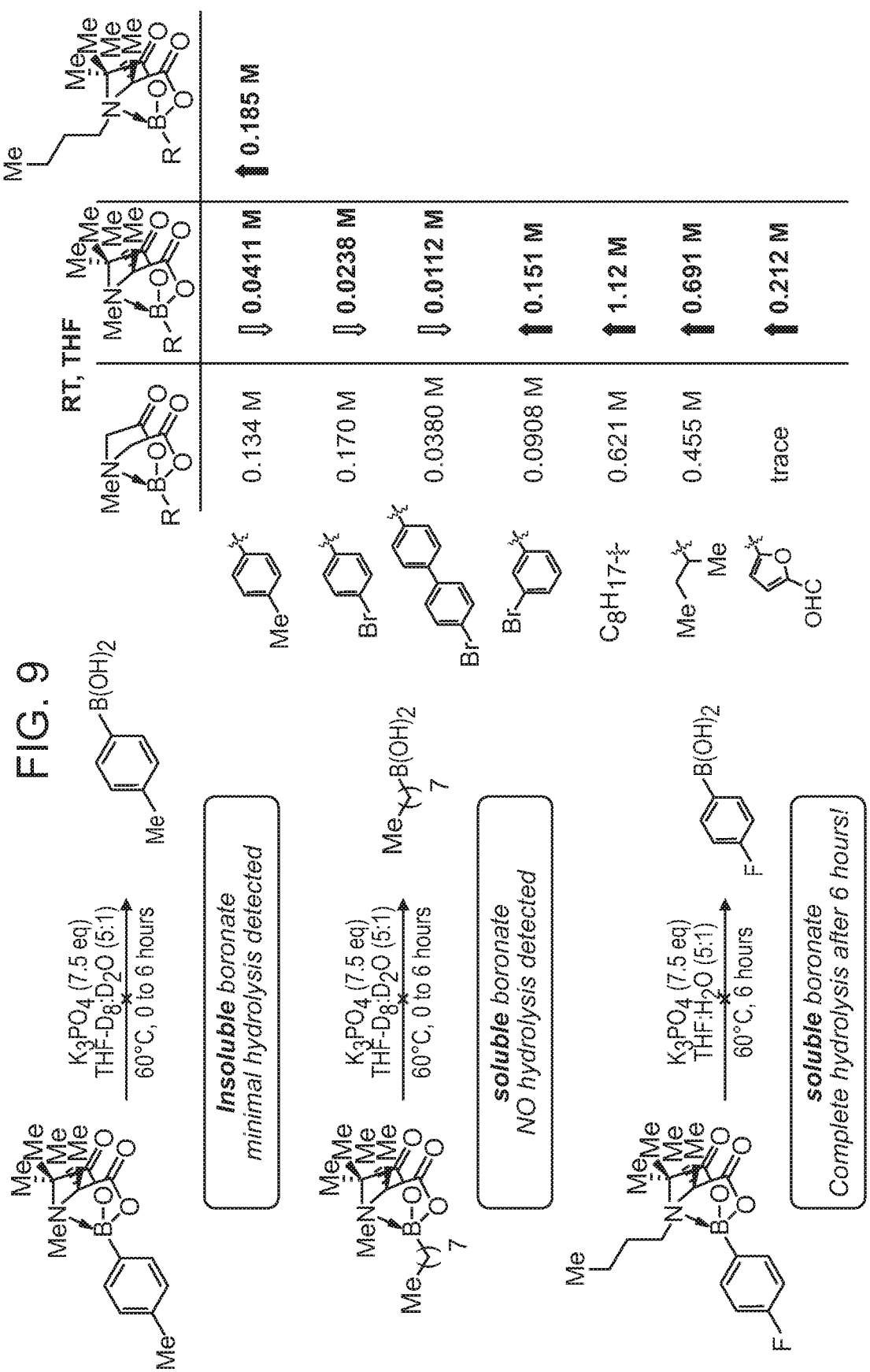
FIG. 9 depicts the relative solubilities of a series of peralkylated MIDA boronates.

Initial TIDA boronate hydrolysis experiments were complicated by the lack of solubility of p-tolylTIDA boronate—the boronate was delivered as a slurry, not a solution, in THF. To confirm that the lack of hydrolysis was due to the stability of the boronate and not its insolubility, octylTIDA boronate was prepared. Gratifyingly, this completely soluble boronate showed no measurable hydrolysis after 6 hours. To probe whether solubility is an issue across a wider range of substrates, a collection of aryl, heteroaryl, and alkyl TIDA boronates were prepared and their solubility in room temperature THF was measured and compared to the parent MIDA boronate (FIG. 9). In the case of para substituted phenyl rings, the TIDA boronates were less soluble than the MIDA boronates (~0.01 to 0.04 M vs. ~0.03 to 0.17 M), and would not be able to be easily transferred using THF. However, all of the other TIDA boronates were in fact more soluble than their MIDA counterparts (0.15 M to 1.1 M vs 0.09 M to 0.6 M). Further, a much more soluble derivative of TIDA was prepared, where the N-methyl group was replaced with an N-butyl group (N-butyl TIDA). The corresponding boronate actually fully hydrolyzed after 6 hours, consistent with previous observations that bigger groups on N increase the rate of hydrolysis.

Solubility Measurements were Acquired According to the Following Procedure:

To determine the solubility of each boronate given in the following table, a concentrated solution was prepared by repeated addition to a small amount (~200 µL) of room temperature THF in a 7-mL vial until solid no longer dissolved upon stirring. The vials were then allowed to stir at room temperature overnight. The next day, all solutions still had solid suspended in them. 100 µL of the mixture was then filtered and had solvent removed. The residue was then taken up in 500 µL DMSO-d$_6$ containing 1,4-dimethoxybenzene (~0.01 M) as an internal standard and transferred to an NMR tube. The concentrations of the solutions were then determined by integration relative to internal standard. In each case, the measurements are an average of two experiments. In the case of 5-Formyl-2-furyl MIDA boronate, only trace amounts of the material were observable, making accurate integrations difficult.

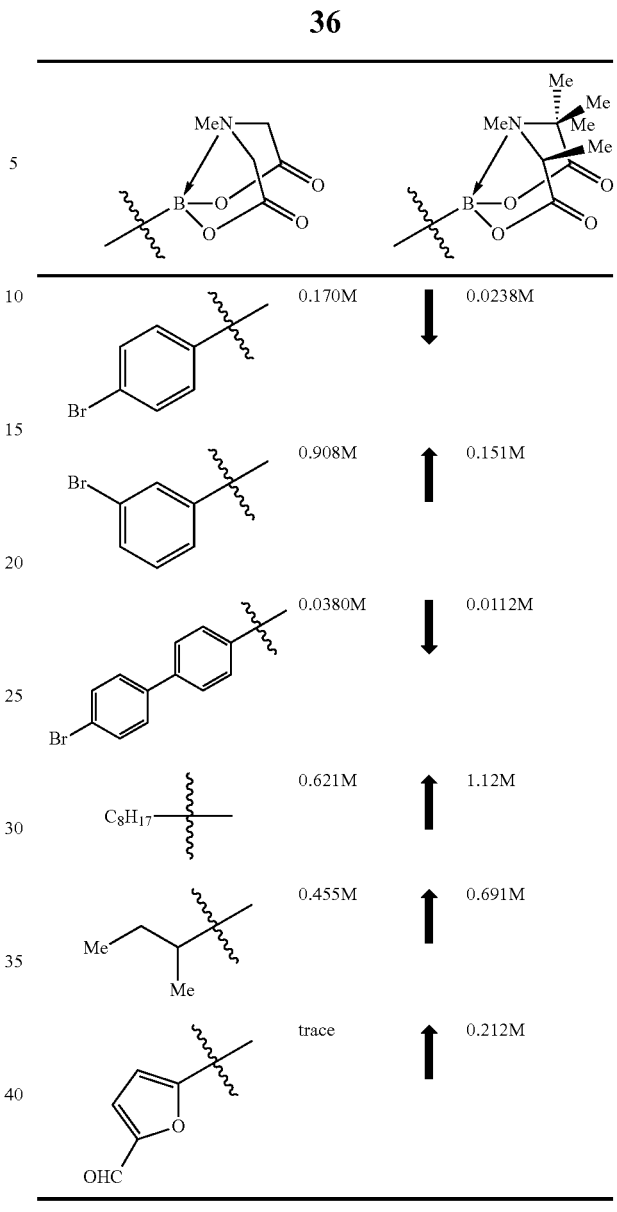

Example 5: Deprotection Conditions

Figure 10:
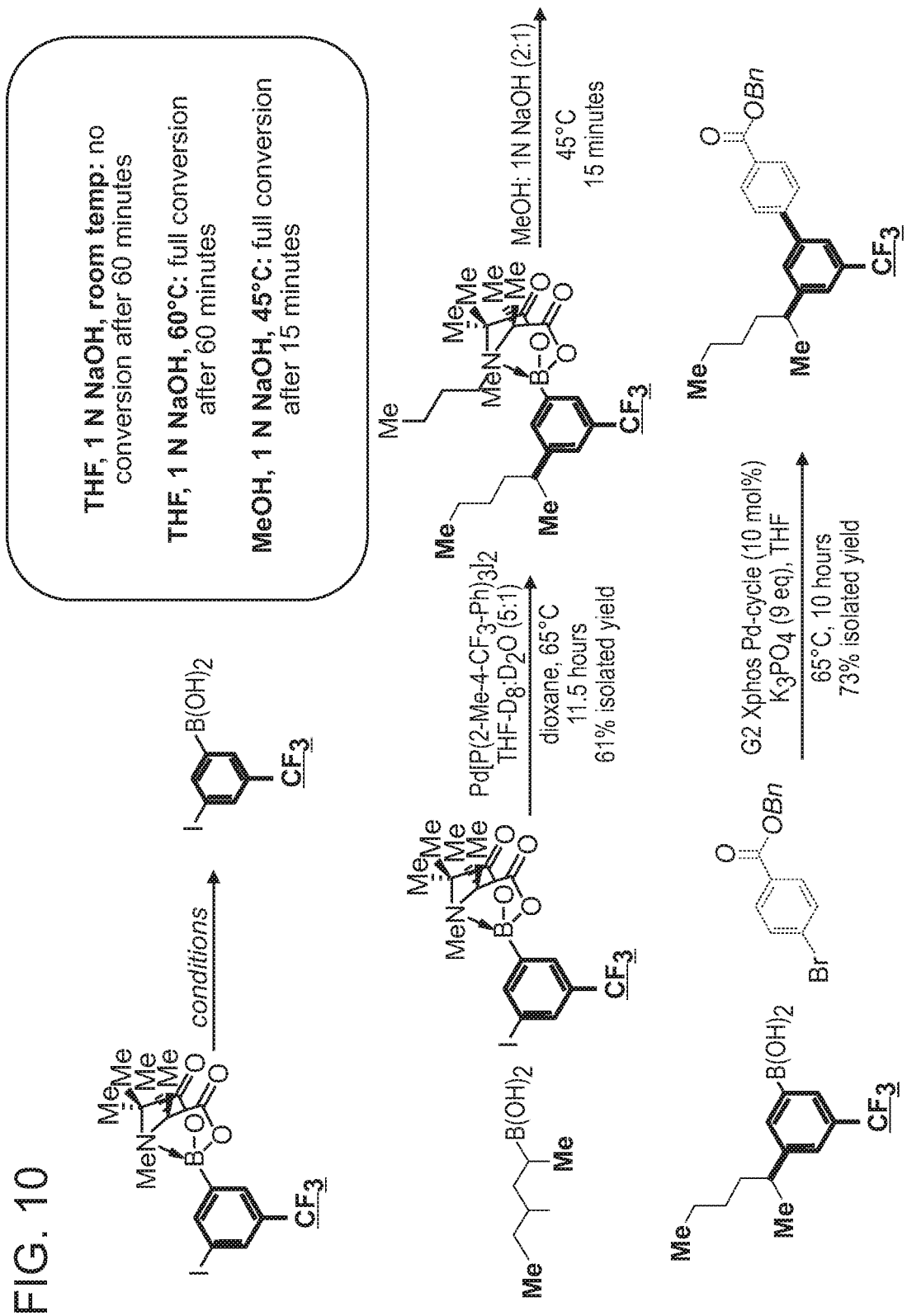
FIG. 10 is a reaction scheme showing a two-stage cross coupling using boronic acid and peralkylated MIDA boronate reagents (TIDA boronate).

Various deprotection conditions were investigated in order to probe the use of these more stable boronates within the context of iterative cross-coupling. First, treatment with 1 N NaOH in THF at room temperature showed no conversion after stirring for 60 minutes. Heating this reaction up to 60° C. resulted in full conversion after a further 60 minutes. Separately, it was shown that by treatment with 1 N NaOH in MeOH at 45° C. resulted in full conversion after 15 minutes. These conditions were utilized in the first cycle of iterative cross coupling which made use of the coupling of an unactivated secondary alkyl boronic acid coupling partner, which was made possible through the use of the new more stable TIDA ligand (FIG. 10).

Example 6: Cross-Coupling Reactions

Figure 11:
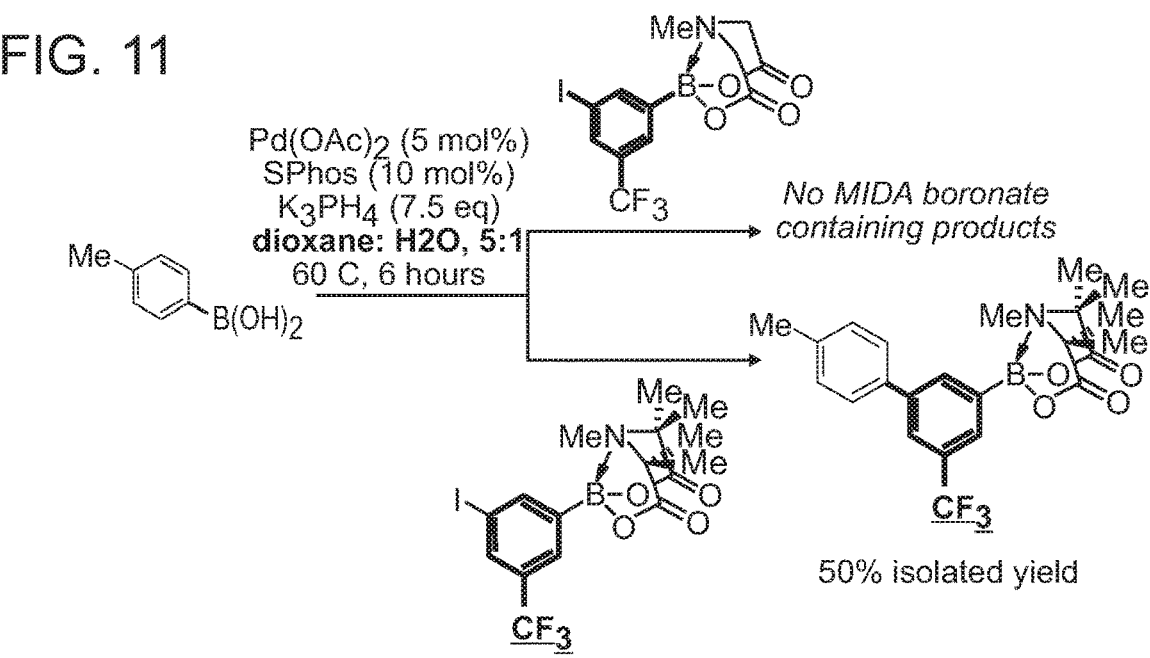
FIG. 11 is a reaction scheme of a cross coupling, demonstrating the survival of a peralkylated MIDA reagent (TIDA boronate) under biphasic aqueous Suzuki cross-coupling reaction conditions. In contrast, the non-alkylated MIDA reagent does not survive the same reaction conditions.

TIDA boronates can survive biphasic aqueous basic Suzuki coupling conditions. When 4-tolylboronic acid was attempted to be coupled to 3-iodo-5-trifluoromethylphenylMIDA boronate under aqueous conditions, no MIDA boronate containing products were observed. However, when the corresponding TIDA boronate was used, a 50% isolated yield of the desired coupling product was obtained (FIG. 11).

The following protocol was followed:

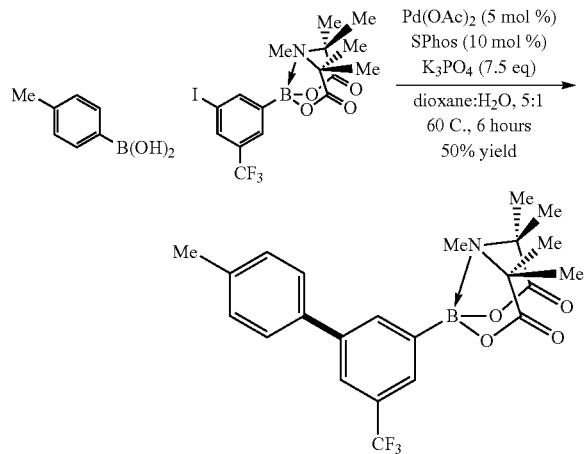

Under ambient atmosphere, Pd(OAc)$_2$ (5.6 mg, 0.025 mmol, 5 mol %), SPhos (20.5 mg, 0.05 mmol, 10 mol %), 3-iodo-5-(trifluoromethyl)phenyl TIDA boronate (241.5 mg, 0.5 mmol, 1.0 eq.), and p-tolylboronic acid (81.6 mg, 0.6 mmol, 1.2 eq.) were charged into a 40 mL vial containing a stir bar. The vial was then sealed with a PTFE-lined septum screw cap and wrapped with Teflon tape. The vial was then placed under vacuum and back filled nitrogen three times before adding dioxane (7.25 mL). The mixture was then stirred at room temperature for 10 minutes, giving a deep red homogenous solution. Aqueous K$_3$PO$_4$ (1.25 mL, 3.0 M, 3.75 mmol, 7.5 eq.) was then added via syringe and the vial was placed in a 60° C. heat block and allowed to stir for 6 hours. At this point, TLC (20% acetone/hexanes, KMnO$_4$) appeared to indicate no conversion; however it was later determined that the starting material and product co-elute. The reaction mixture was partitioned between EtOAc (30 mL) and water (30 mL). The aqueous layer was extracted with EtOAc (3×30 mL). The combined organics were then washed with brine (30 mL), dried over MgSO$_4$, filtered, and concentrated under reduced pressure. Crude $^1$H NMR showed product as the main component of the resulting solid. The solid was then adsorbed onto Celite from an acetone solution and then placed atop a silica gel column equilibrated with 20% acetone/hexanes. Column chromatography (20% to 30% to 40% acetone/hexanes) gave 110.7 mg (50% yield) of a white solid.

$^1$HNMR (500 MHz, CDCl$_3$) δ 7.92 (s, 1H), 7.80 (s, 1H), 7.74 (s, 1H), 7.48 (d, J=8.1 Hz, 2H), 7.27 (d, 2H, overlaps with solvent), 2.53 (s, 3H), 2.41 (s, 3H), 1.83 (br s, 6H), 1.57 (br s, 6H).

Example 7: Structural Insight

Figure 12:
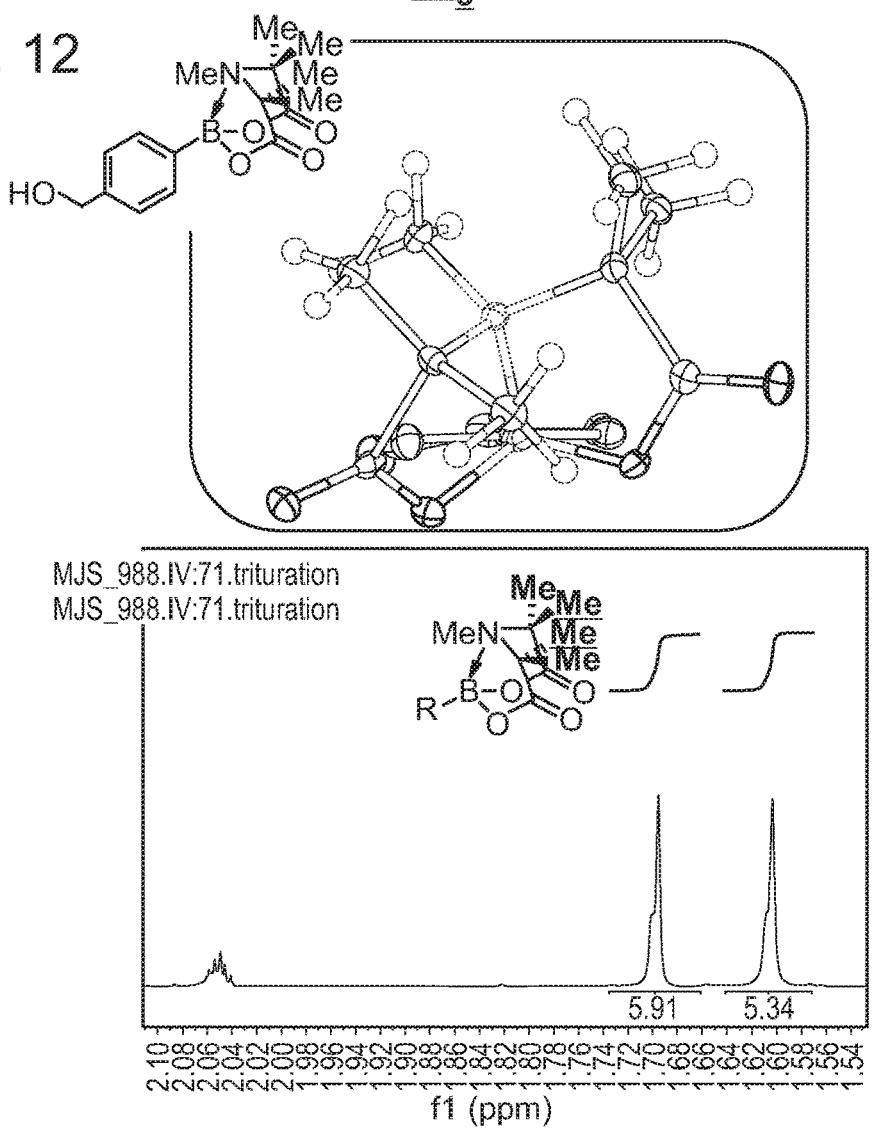
FIG. 12 shows the crystal structure and NMR spectrum of a TIDA boronate reagent.

Finally, an X-ray crystal structure of a TIDA boronate was obtained and revealed interesting structural information. Unlike MIDA boronates which have a mirror plane passing through the C—B—N plane, the TIDA boronates actually skew themselves so that one of the backbone methyl groups dips down inwards towards the internal ligand cavity while the other skews upwards and away from the ligand cavity. However, in solution, these two methyl groups are rapidly interconverting via conformational changes, leading to observation of only two methyl singlets in the NMR as opposed to the expected four singlets (FIG. 12).

Example 8: Synthetic Protocols

I. General Methods

Materials.

Commercial reagents were purchased from Sigma-Aldrich, TCI America, Alfa Aesar, Strem Chemicals Inc., Fisher Scientific, or Combi Blocks and used without further purification unless otherwise noted. Solvents were purified via passage through packed columns as described by Pangborn and coworkers (THF, Et$_2$O, CH$_3$CN, CH$_2$Cl$_2$: dry neutral alumina; hexane, benzene, and toluene: dry neutral alumina and Q5 reactant; DMSO, DMF: activated molecular sieves). All water was deionized prior to use.

General Experimental Procedures.

All reactions were performed in flame- or oven (125° C.)-dried glassware under an atmosphere of dry nitrogen or argon unless otherwise stated.

Organic solutions were concentrated via rotary evaporation under reduced pressure with a bath temperature of 30-40° C. Reactions were monitored by analytical thin layer chromatography (TLC) on Merck silica gel 60 F254 plates (0.25 mm) using the indicated solvent system. Compounds were visualized by exposure to UV light (254 nm), or by treatmeant with a basic potassium permanganate (KMnO4) solution followed by brief heating with a Varitemp heat gun. MIDA boronates are compatible with standard silica gel chromatography, include standard loading techniques. Column chromatography was performed on silica gel (Merck Grade 938, pore size 60 Å, 230-400 mesh particle size, Ald. #227196) with indicated solvent systems).

II. Experimental Procedures i. Synthesis of MIDA Ligand Derivatives

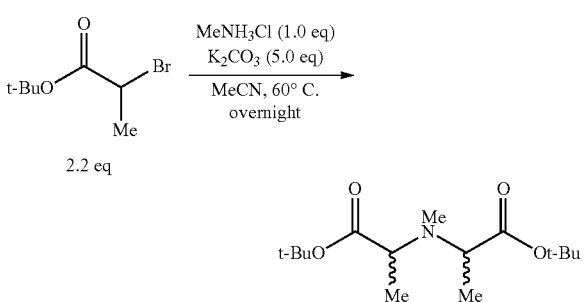

DimethylMIDA tButyl Ester.

Under ambient atmosphere, methylamine hydrochloride (3.76 g, 55.7 mmol), potassium carbonate (38.48 g, 278.5 mmol), and MeCN (80 mL) were charged into a 250 mL roundbottom flask containing a stir bar. Tert-butyl 2-bromopropionate (25.62 g, 122.5 mmol) was then weighed into a small beaker and poured into the flask, rinsing with further 20 mL of MeCN. The flask was then fit with a rubber septum and flushed with dry nitrogen for 10 minutes. The flask was then stirred overnight in an oil bath at 60° C. while under a positive pressure of nitrogen. The next day, the crude reaction mixture was filtered through a ~2 cm silica gel plug, rinsing with EtOAc (~50 mL) and acetone (~20 mL). The solvent was then removed in vacuo to give 17.13 g of a yellow oil which was primarily product as a ~1:1 mixture of diastereomers. For large scale preparation, this crude material was taken onto the next step without further purification, although purified material can be obtained by column chromatography (10% EtOAc/hexanes).

¹HNMR (500 MHz, CDCl₃) δ 3.43 (app dq, 2H), 1.45 (app d, 18H), 1.27 (app dd, 6H).

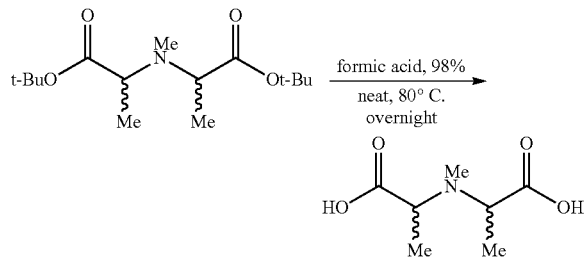

DimethylMIDA.

Crude dimethylMIDA t-butyl ester (17.13 g, approximately 60 mmol) was charged into a 200 mL roundbottom flask, followed by formic acid (60 mL). The flask was fitted with a rubber septum and briefly flushed with nitrogen before being stirred in an 80° C. overnight. The next day, TLC (100% EtOAc, KMnO₄) showed no remaining starting material and a large smear at the baseline (presumably product and formic acid). Formic acid was then removed by rotary evaporation in a 50° C. bath, followed by being placed under high vacuum in an 80° C. heat block, giving a tacky tan solid. This solid was then taken up in EtOH (~15 mL) with warming via heat gun. To this solution was added acetone (75 mL) dropwise with stirring over ~10 minutes, causing precipitation of a white solid. The solid was then collected by vacuum filtration and washed copiously with acetone (~100 mL). The resulting white crystalline solid was then dried under high vacuum overnight to give 8.62 g (88% yield over two steps) of product as a 1:1 mixture of diastereomers.

¹H NMR (500 MHz, DMSO-d₆) δ 3.48 (app dq, 2H), 3.46 (br s, 2H), 2.28 (app d, 3H), 1.20 (app dd, 6H).

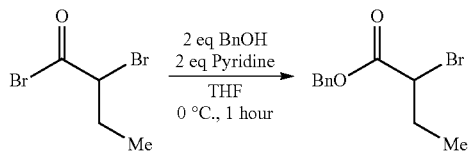 [SMILES: CCC(Br)C(=O)Br ; CCC(Br)C(=O)OCc1ccccc1]

Benzyl 2-Bromobutyrate.

A 100 mL Schlenk flask with a stir bar and stoppered with a rubber septum was vac/filled three times with nitrogen. Benzyl alcohol (5.2 mL, 50 mmol, 2 eq.), THF (50 mL), and pyridine (4.05 mL, 50 mmol, 2 eq.) were added via syringe while stirring. The reaction was cooled to 0° C. in an ice bath, and 2-bromobutyrl bromide (3.02 mL, 25 mmol) was added dropwise to the stirring solution over 10 minutes, producing a yellow color. After 1 hour of stirring in the ice bath, the reaction was quenched with the addition of water (50 mL) via syringe. The mixture was transferred to a separatory funnel, and the aqueous layer was extracted with diethyl ether (3×30 mL). The combined organics were washed with saturated NH₄Cl (2×25 mL), water (25 mL), saturated NaHCO₃ (25 mL) and brine (25 mL). The organics were dried with MgSO₄, filtered over a pad of Celite, and solvent was removed via rotary evaporation, producing a clear oil (8.80 g crude). The crude product was dry loaded on Celite and placed atop a silica gel column equilibrated with 20% ethyl acetate in hexanes. A clear oil was obtained (96% yield).

¹H NMR (500 MHz, CDCl₃) δ 7.38 (m, 5H), 5.21 (s, 2H), 4.22 (dd, 1H), 2.13 (dq, J=14.2, 7.1 Hz, 1H), 2.03 (dq, J=14.8, 7.5 Hz, 1H), 1.02 (app t, J=7.3 Hz, 3H).

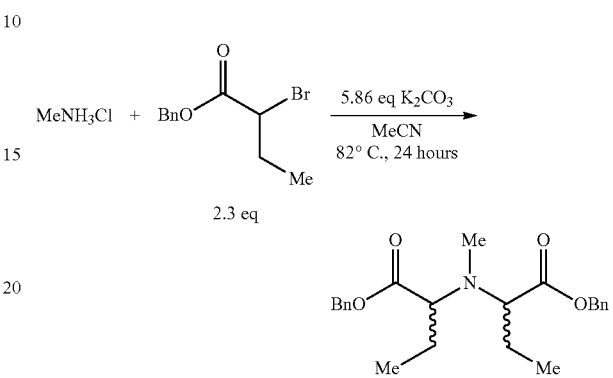

DiethylMIDA Benzyl Ester.

A 20 mL vial with a stir bar was charged with potassium carbonate (2.743 g, 19.81 mmol, 5.86 eq) and methylamine hydrochloride salt (224.5 mg, 3.38 mmol, 1 eq). The vial was capped and purged with nitrogen for 10 minutes. Acetonitrile (3.9 mL) and the 2-bromobenzyl ester (2.008 g, 7.78 mmol, 2.3 eq) were added subsequently with stirring via syringe. The nitrogen inlet was removed and the vial was sealed with Teflon tape. The reaction was heated at 82° C. in a heat block for 24 hours. The solvent had evaporated off in the vial, leaving a white paste. The mixture was filtered over a pad of Celite and washed with ethyl acetate. The solvent was removed via rotary evaporation, producing a pale, yellow oil (1.50 g crude). A gradient silica column was run with 7.5-10% ethyl acetate in hexanes. A clear oil was isolated (441.3 mg, 15% yield) as a mixture of diastereomers.

¹HNMR (500 MHz, CDCl₃) δ 7.33 (app m, 10H), 5.04 (app ddd, 4H), 3.33 (app dt, 2H), 2.50 (app d, 3H), 1.76 (m, 4H), 0.88 (app dd, 6H).

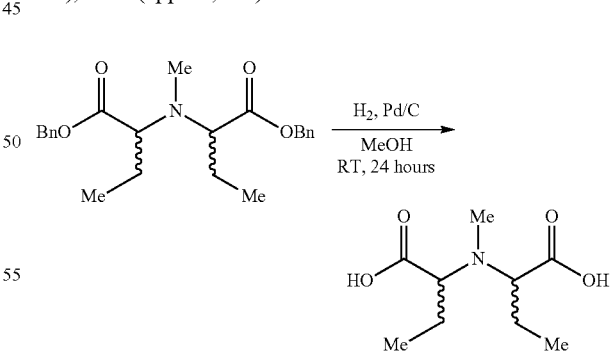

DiethylMIDA.

A 40 mL vial was charged with a stir bar and the DEMIDA dibenzyl ester (441.3 mg, 1.151 mmol, 1 eq.) was added anhydrous methanol (8.1 mL). The vial was capped and purged for 10 minutes with nitrogen gas bubbling through the solution while stirring. 10% palladium on carbon (21.4 mg) was added by replacing the cap. The vial was purged once more with nitrogen for 10 minutes. One balloon filled with hydrogen gas was bubbled through the reaction mixture. The vial was placed under one balloon of hydrogen for 24 hours with stirring. The balloon was removed and the reaction purged for 20 minutes with nitrogen. The reaction was filtered over a pad of Celite, and washed with methanol (3×30 mL). Solvent was removed via rotary evaporation and the compound was placed on the high vacuum, producing a crystalline, white solid (242.8 mg, 100% yield) as a mix of diastereomers.

$^1$H NMR (500 MHz, DMSO-$d_6$) δ 3.14 (app dt, 2H), 2.31 (app d, 3H), 1.58 (app ddq, 4H), 0.83 (app td, 6H).

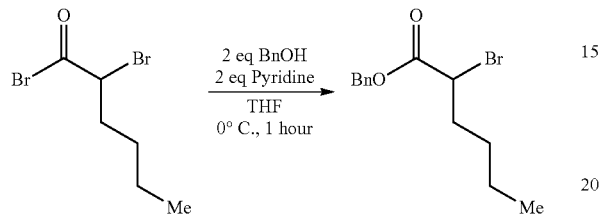

Benzyl 2-Bromohexanoate.

This compound was synthesized in a manner analogous to benzyl 2-bromobutyrate using 3.96 mL (25 mmol, 1 eq.) of 2-bromohexanoyl bromide. A clear oil (6.884 g, 97% yield) was isolated.

$^1$HNMR (500 MHz, CDCl$_3$) δ 7.38 (m, 5H), 5.21 (s, 2H), 4.25 (dd, J=7.8, 7.0 Hz, 1H), 2.02 (m, 2H), 1.35 (m, 4H), 0.89 (app t, J=7.0 Hz, 3H).

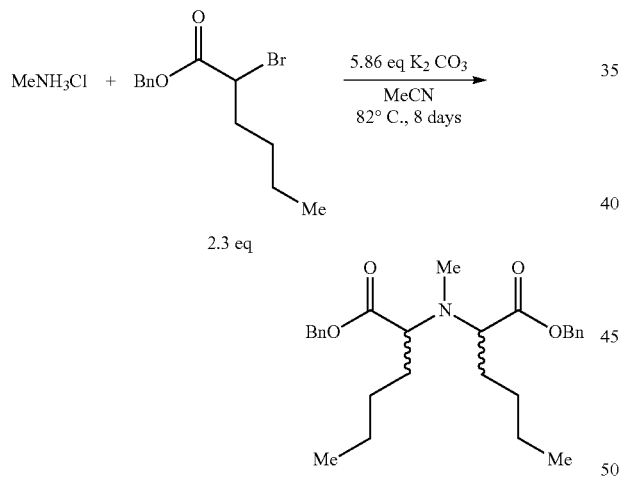

DibutylMIDA Benzyl Ester.

A 20 mL vial with stir bar was charged with potassium carbonate (2.067 g, 14.8 mmol, 5.86 eq.) and methylamine hydrochloride salt (203.6 mg, 3.02 mmol, 1 eq.). The vial was capped and purged with nitrogen for 10 minutes. Acetonitrile (3.5 mL) and the 2-bromobenzyl ester (2.007 g, 7.01 mmol, 2.3 eq.) were added subsequently with stirring via syringe. The nitrogen inlet was removed and the vial was sealed with Teflon tape. The reaction was heated at 82° C. in a heat block for 8 days. The mixture was filtered over a pad of Celite and washed with ethyl acetate (3×35 mL). The solvent was removed via rotary evaporation, producing a pale, yellow oil (1.43 g crude). A gradient silica column was run with 7.5-10% ethyl acetate in hexanes. A clear oil was isolated (709.4 mg, 52% yield) as a mixture of diastereomers.

$^1$HNMR (500 MHz, CDCl$_3$) δ 7.34 (m, 10H), 5.04 (app ddd, 4H), 3.40 (app dt, 2H), 2.51 (app d, 3H), 1.71 (m, 4H), 1.26 (m, 8H), 1.84 (td, 6H).

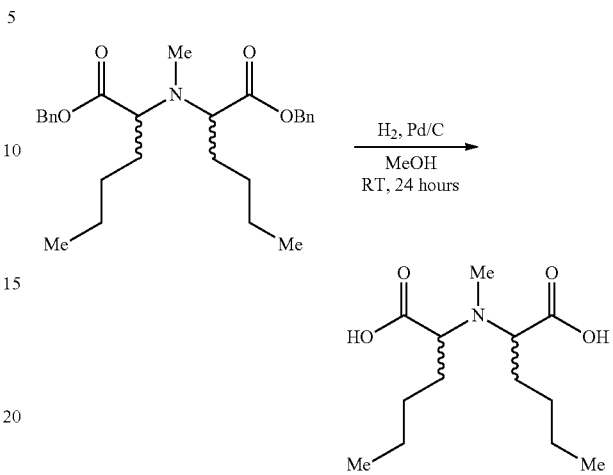

DibutylMIDA.

This compound was synthesized in a manner analogous to diethylMIDA using 666.4 mg (1.52 mmol, 1.0 eq) of dibutylMIDA benzyl ester. 388.2 mg (99% yield) of a white crystalline solid was obtained as a mixture of diastereomers.

$^1$H NMR (500 MHz, DMSO-$d_6$) δ 3.20 (app dt, 2H), 2.32 (app d, 3H), 1.55 (m, 4H), 1.24 (m, 8H), 0.84 (t, 6H).

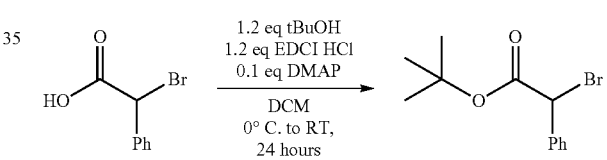

t-Butyl 2-bromo-2-phenylacetate

A 250 mL Schlenk flask was charged with a stir bar, the 2-bromo acid (6.45 g, 30 mmol, 1 eq.), and DMAP (366.5 mg, 3.0 mmol, 0.1 eq.). The flask was sealed with a rubber septum and vac/filled three times with nitrogen gas. DCM (110 mL) was added via syringe, producing a yellow, clear solution. Tert-butanol (3.5 mL, 36 mmol, 1.2 eq.) was added via syringe and the flask was cooled to 0° C. in an ice bath for 15 minutes. The septum was removed and EDCI.HCl (6.90 g, 36 mmol, 1.2 eq.) was added. DCM (10 mL) was used to wash flask, and the septum was replaced. The water bath was removed, and the reaction was stirred for 24 hours at room temperature. The reaction was quenched with the addition of water (50 mL). The mixture was transferred to a separatory funnel, and the aqueous layer was extracted with ethyl acetate (3×50 mL). The organics were washed with brine (50 mL), dried with MgSO$_4$, filtered over a pad of Celite, and solvent was removed via rotary evaporation. Column chromatography (2.5-5% EtOAc/hexanes) gave 1.734 g (21% yield) of a clear oil.

$^1$H NMR (500 MHz, CDCl$_3$) δ 7.48 (dd, 2H), 7.36 (m, 3H), 5.25 (s, 1H), 1.44 (s, 9H).

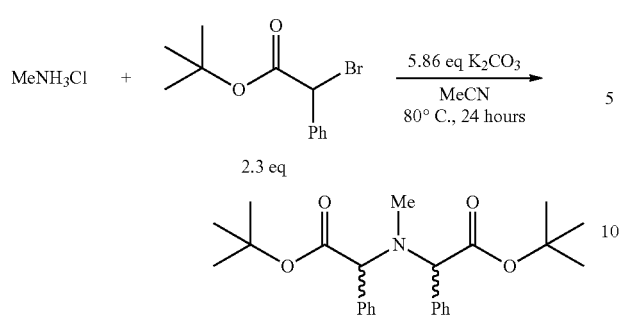

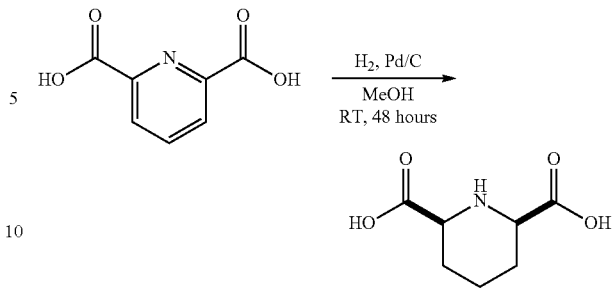

DiphenylMIDA t-Butyl Ester.

A 20 mL vial with stir bar was charged with potassium carbonate (3.96 g, 28.66 mmol, 5.86 eq.) and methylamine hydrochloride salt (338 mg, 4.89 mmol, 1 eq.). The vial was capped and purged with nitrogen for 10 minutes. Acetonitrile (5.6 mL) and the 2-bromo-t-butyl ester (3.04 g, 11.25 mmol, 2.3 eq.) were added subsequently with stirring via syringe. The nitrogen inlet was removed and the vial was sealed with Teflon tape. The reaction was heated at 80° C. in a heat block for 24 hours. The mixture was filtered over a pad of Celite and washed with ethyl acetate (3×35 mL). The solvent was removed via rotary evaporation, producing a pale, yellow oil. A silica column was run and the product was isolated (1.29 g, 64% yield) as a mixture of diastereomers.

$^1$H NMR (500 MHz, CDCl$_3$) δ 7.48 (app dd, 4H), 7.32 (m, 6H), 4.49 (app d, 2H), 3.29 (app d, 3H), 1.44 (app d, 18H).

2,6-Piperidinedicarboxylic Acid 2,6-Pyridinedicarboxylic acid (1.50 g, 9.00 mmol) was placed into a 100 mL recovery flask along with MeOH (28 mL). The mixture was then degassed by bubbling nitrogen through it with stirring for 10 minutes. Pd/C (150 mg, 10 wt %, wet, Degussa type) was then added in a single portion before sealing the flask with a rubber septum and Teflon tape. Hydrogen gas was then bubbled through the solution with stirring for ~10 minutes (1 balloon) before being placed under an atmosphere of hydrogen (3 balloons simultaneously) and stirred for a total of 48 hours. The mixture was then degassed by bubbling nitrogen through it as before (10 minutes) before filtering over Celite and washing with MeOH (500 mL). Solvent was removed under vacuum and the resulting solid was recrystallized from water to give 851.4 mg (55% yield) of flaky off-white crystals.

$^1$H NMR (500 MHz, DMSO-d$_6$) δ 3.43 (dd, 2H), 2.03 (m, 2H), 1.79 (m, 1H), 1.49 (m, 3H).

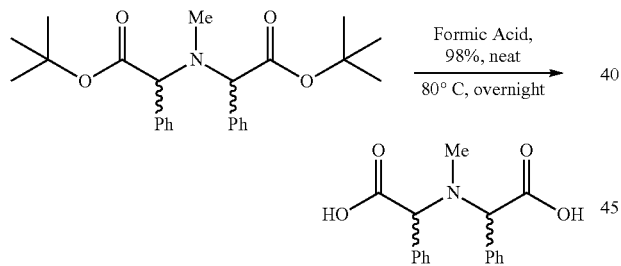

DiphenylMIDA.

A 20 mL vial was charged with a stir bar, the DPMIDA di-t-butyl ester (1.29 g, 3.12 mmol, 1 eq.), and formic acid (3.1 mL, 82.6 mmol, 26 eq.). The vial was capped and stirred at 80° C. overnight. The reaction mixture was cooled, and transferred to a 100 mL RBF. The formic acid was removed via rotary evaporation, producing a light brown solid. Methanol (around 4 mL) was added to the solid, creating a suspension. The suspension was sonicated, and five volumes of acetone (20 mL) were added dropwise to the stirring suspension over 15 minutes. The mixture was vacuum filtered over filter paper. The resulting solid was transferred to a 20 mL vial and placed on high vacuum for one hour. The diacid was isolated as a white crystalline solid (515.7 mg, 55% yield), and as a single diastereomer.

$^1$H NMR (500 MHz, DMSO-d$_6$) δ 7.40 (m, 8H), 7.33 (m, 2H), 4.51 (s, 2H), 3.33 (s, 18H), 2.03 (s, 3H).

SchMIDA.

Cis-2,6-piperidinedicarboxylic acid (173 mg, 1.0 mmol), formalin (5.0 mL) and formic acid (75 μL, 2.0 mmol) were placed in a 20 mL vial under ambient atmosphere. This vial was sealed and placed in a 100° C. heat block and allowed to stir overnight. The reaction was then cooled to room temperature and rinsed into an Erlenmeyer flask with water (5 mL). Acetone (50 mL) was added with stirring, causing a slight amount of precipitation. Diethyl ether (50 mL) was then added with stirring, causing more significant precipitation. The solid was then collected by vacuum filtration and dried under high vacuum overnight, yielding 52.1 mg (28% yield) of a white crystalline solid.

$^1$H NMR (500 MHz, DMSO-d$_6$) δ 2.79 (dd, 2H), 2.18 (s, 3H), 1.81 (dd, 2H), 1.74 (m, 1H), 1.49 (qd, 2H), 1.33 (qt, 1H).

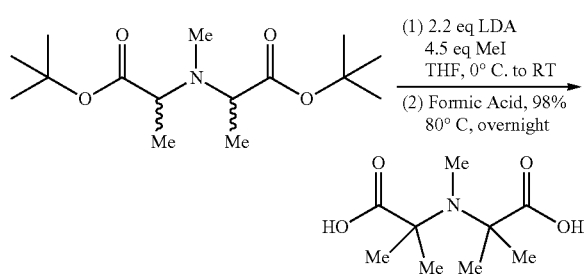

TetramethylMIDA (TIDA).

To a solution of DIPA (3.22 mL, 23.0 mmol, 2.2 eq.) in THF (26 mL) under nitrogen at −78° C. was added n-BuLi (14.35 mL, 1.6 M in hexanes, 22.96 mmol, 2.2 eq.) dropwise over 5 minutes. The reaction was placed in an ice bath and stirred at 0° C. for 25 minutes, giving a light yellow homogenous solution. Substrate was added as a solution in THF (26 mL) over ~15 minutes. After stirring at 0° C. for 30 minutes, methyl iodide (2.92 mL, 47.0 mmol, 4.5 eq.) was added dropwise over 5 minutes. The ice bath was then removed and the reaction was warmed to room temperature. Precipitate formed and TLC (10% EtOAc/hexanes, KMnO$_4$) showed complete conversion. The reaction was then quenched with NH$_4$Cl solution (25 mL), extracted with EtOAc (3×50 mL), dried over sodium sulfate, filtered, and concentrated under vacuum to a yellow oil with some solids suspended in it. This was taken on to the next step without further purification.

To the crude intermediate from the above reaction was added 10.5 mL 98% formic acid while transferring to a capped 40 mL vial. The homogenous solution was stirred at 80° C. overnight. The reaction was then concentrated under vacuum to a brown solid. This solid was dissolved in ~18 mL water with heating, and this solution was then washed once with 20 mL DCM. Residual DCM in the aqueous layer was blown off under a nitrogen stream. In an Erlenmeyer flask, 100 mL of acetone was added to this solution to induce crystallization. After 30 minutes stirring in an ice bath, the solids were collected by filtration and dried under high vacuum to give a white solid (1.48 g, 70% yield) over two steps.

$^1$H NMR (500 MHz, DMSO-d$_6$) δ 2.37 (s, 3H), 1.34 (s, 12H).

ii. Synthesis of MIDA Boronate Derivatives

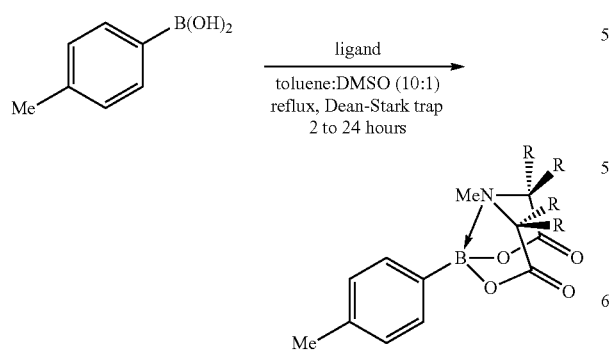

General Procedure for the Synthesis of p-Tolyl MIDA Boronate Derivatives.

Under ambient atmosphere, a recovery flask containing a stir bar was charged with p-tolylboronic acid and ligand. To this was added a given volume 10:1 solvent mixture of toluene and DMSO before fitting the flask with a Dean-Stark trap (prefilled with toluene) and condenser. This flask was then stirred in an oil bath at 110-120° C. with azeotropic removal of water until TLC indicated consumption of starting material. The reaction mixture was then cooled and poured into a separatory funnel containing water (five times the reaction volume) and EtOAc (five times the reaction volume). After shaking and phase separation, the aqueous layer was extracted twice with EtOAc (five times the reaction volume). The combined organic layers were then washed sequentially with water, 1:1 water:brine, and brine (five times the reaction volume each), dried over MgSO$_4$, filtered, and concentrated in vacuo. The resulting solid was then purified by column chromatography, crystallization, or a combination thereof. In the cases where diastereomers were possible, the two isomers were separated by column chromatography.

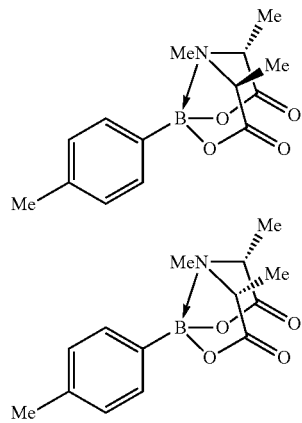

p-Tolyl DimethylMIDA Boronate.

The general procedure was followed using dimethylMIDA (200 mg, 1.14 mmol, 1.0 eq.), p-tolylboronic acid (1.2 eq.), and 12 mL 10:1 toluene:DMSO. The resulting mixture of product diastereomers was purified by two rounds of column chromatography (10% to 20% to 30% acetone/hexanes) to give 95.7 mg (30% yield) of the out-out and 107.3 mg (34% yield) of the in-out diastereomers, respectively.

$^1$H NMR (500 MHz, acetone-d$_6$)

[out-out diastereomer] δ 7.42 (d, J=7.9 Hz, 2H), 7.18 (d, J=7.7 Hz, 2H), 4.18 (q, J=7.3 Hz, 2H), 2.46 (s, 3H), 2.32 (s, 3H), 1.49 (d, J=7.3 Hz, 6H).

[in-out diastereomer] δ 7.40 (d, J=7.9 Hz, 2H), 7.18 (d, J=7.8 Hz, 2H), 4.25 (q, J=7.1 Hz, 1H), 4.12 (q, J=7.1 Hz, 1H), 2.47 (s, 3H), 2.32 (s, 3H), 1.60 (d, J=7.0 Hz, 3H), 1.56 (d, J=7.1 Hz, 3H).

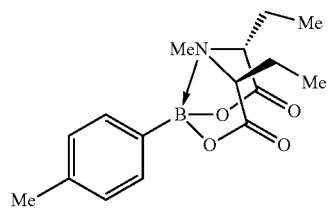

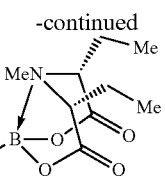

p-Tolyl DiethylMIDA Boronate.

The general procedure was followed using diethylMIDA (210.6 mg, 1.04 mmol, 1.0 eq.), p-tolylboronic acid (211.3 mg, 1.55 mmol, 1.5 eq.), and 10 mL of a 95:5 toluene:DMSO solvent mixture. Column chromatography (0 to 2% MeOH/DCM) gave 95.8 mg (30% yield) of the out-out and 123.4 mg (40% yield) of the in-out diastereomers, respectively.

$^1$H NMR (500 MHz, DMSO-$d_6$)

[out-out diastereomer] δ 7.41 (d, J=7.9 Hz, 2H), 7.17 (d, J=7.7 Hz, 2H), 3.90 (dd, J=9.9, 5.5 Hz, 2H), 2.49 (s, 3H), 2.32 (s, 3H), 1.99 (m, 2H), 1.84 (m, 2H) 1.21 (t, J=7.4 Hz, 6H).

[in-out diastereomer] δ 7.39 (d, J=7.8 Hz, 2H), 7.17 (d, J=7.4 Hz, 2H), 3.91 (dd, J=7.3, 6.0 Hz, 1H), 3.83 (dd, J=9.5, 4.3 Hz), 2.50 (s, 3H), 2.32 (s, 3H), 2.13-2.00 (m, 2H), 2.01-1.92 (m, 2H), 1.33 (t, J=7.4 Hz, 3H), 1.30 (t, J=7.4 Hz, 3H).

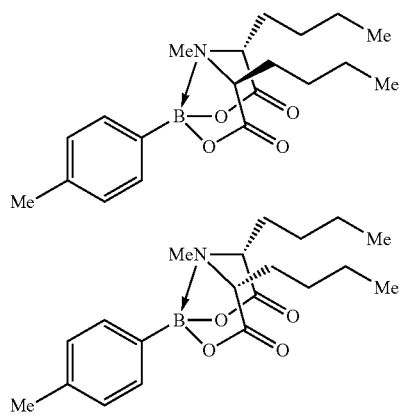

p-Tolyl DibutylMIDA boronate.

The general procedure was followed using dibutylMIDA (354.1 mg, 1.37 mmol, 1.0 eq.), p-tolylboronic acid (278.4 mg, 2.05 mmol, 1.5 eq.), and 13 mL of a 95:5 toluene:DMSO solvent mixture. Column chromatography (0 to 2% MeOH/DCM) gave 109.5 mg (22% yield) of the out-out and 265.1 mg (54% yield) of the in-out diastereomers, respectively.

$^1$H NMR (500 MHz, DMSO-$d_6$)

[out-out diastereomer] δ 7.48 (d, J=7.8 Hz, 2H), 7.29 (d, J=7.4 Hz, 2H), 3.87 (dd, J=9.2, 6.2 Hz, 2H), 2.44 (s, 3H), 2.42 (s, 3H), 1.84 (m, 6H), 1.48 (m, 6H), 1.02 (t, J=7.3 Hz, 6H).

[in-out diastereomer] δ 7.40 (d, J=7.8 Hz, 2H), 7.17 (d, J=7.2 Hz, 2H), 3.96 (dd, 1H), 3.86 (dd, 1H), 2.53 (s, 3H), 2.32 (s, 3H), 1.98 (m, 6H), 1.60 (m, 2H), 1.43 (m, 4H), 0.95 (t, J=7.4 Hz, 3H), 0.93 (t, J=7.4 Hz, 3H).

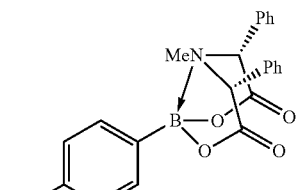

p-Tolyl DiphenylMIDA Boronate.

The general procedure was followed using diphenylMIDA (515.7 mg, 1.72 mmol, 1 eq.), p-tolylboronic acid (349.6 mg, 2.58 mmol, 1.5 eq.), and 16.4 mL of a 95:5 toluene:DMSO solvent mixture. Column chromatography (0 to 2% MeOH/DCM) gave the in-out diastereomer (285.6 mg, 42% yield) as a white crystalline solid.

$^1$H NMR (500 MHz, DMSO-$d_6$) δ 7.70 (d, 2H), 7.60 (m, 1H), 7.52 (m, 4H), 7.23 (m, 3H), 7.04 (m, 2H), 6.37 (d, 2H), 5.75 (s, 1H), 5.64 (s, 1H), 2.35 (s, 3H), 2.16 (s, 3H).

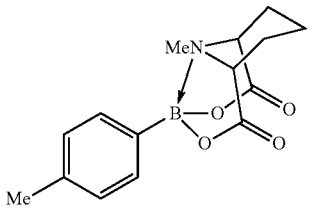

p-Tolyl SchMIDA Boronate.

The general procedure was followed using SchMIDA (49.6 mg, 0.26 mmol, 1.2 eq.), p-tolylboronic acid (30.0 mg, 0.22 mmol, 1.0 eq.), and 11 mL of a 10:1 toluene:DMSO solvent mixture. Column chromatography (30 to 40 to 50% acetone/hexanes) gave 41.2 mg (65% yield) of a white crystalline solid.

$^1$H NMR (500 MHz, acetone-$d_6$) δ 7.49 (d, 2H), 7.32 (d, 2H), 3.89 (t, 2H), 2.58 (s, 3H), 2.45 (s, 3H), 2.17 (m, 4H), 1.86 (m, 2H).

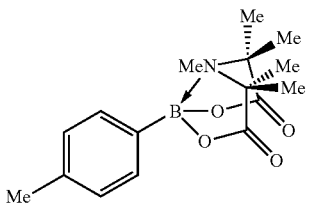

p-Tolyl TIDA Boronate.

The general procedure was followed using TIDA (89.4 mg, 0.443 mmol, 1.1 eq.), p-tolylboronic acid (54.4 mg, 0.403 mmol, 1.0 eq.), and 4 mL of a 95:5 toluene:DMSO solvent mixture. Column chromatography (20 to 40% acetone/hexanes) gave 67.5 mg (55% yield) of a white crystalline solid.

$^1$H NMR (500 MHz, acetone-$d_6$) δ 7.45 (d, 2H), 7.16 (d, 2H), 2.67 (s, 3H), 2.31 (s, 3H), 1.77 (s, 6H), 1.54 (s, 6H).

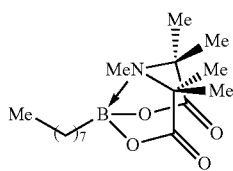

Octyl TIDA Boronate.

The general procedure was followed using TIDA (402.4 mg, 1.98 mmol, 1.1 eq.), octylboronic acid (284.5 mg, 1.8 mmol, 1.0 eq.), and 19.8 mL of a 10:1 toluene:DMSO solvent mixture. Trituration of the crude product with 1:1 diethyl ether:hexanes (3×5 mL) gave 478.1 mg (82% yield) of a white solid.

$^1$H NMR (500 MHz, acetone-d6) δ 2.72 (s, 3H), 1.70 (s, 6H), 1.60 (s, 6H), 1.42 (br m, 2H), 1.30 (br m, 10H), 0.88 (t, J=6.9 Hz, 3H), 0.63 (m, 2H).

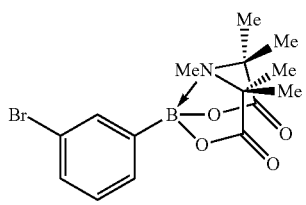

m-Bromophenyl TIDA Boronate.

The general procedure was followed using TIDA (335.3 mg, 1.65 mmol, 1.1 eq.), m-bromophenylboronic acid (301.2 mg, 1.5 mmol, 1.0 eq.), and 16.5 mL of a 10:1 toluene:DMSO solvent mixture. Trituration with 1:1 diethyl ether:hexanes (3×5 mL) gave 302.3 mg (55% yield) of a white solid.

$^1$H NMR (500 MHz, CDCl$_3$) δ 7.68 (s, 1H), 7.49 (app dd, 2H), 7.22 (t, J=7.7 Hz, 1H), 2.50 (s, 3H), 1.79 (br s, 6H), 1.54 (br s, 6H.

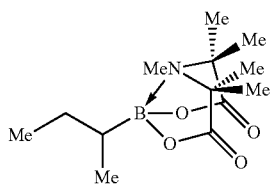

rac-sec-Butyl TIDA Boronate.

The general procedure was followed using TIDA (335.3 mg, 1.65 mmol, 1.1 eq.), rac-sec-butylboronic acid (152.9 mg, 1.5 mmol, 1.0 eq.), and 15 mL of a 10:1 toluene:DMSO solvent mixture. Trituration with 1:1 diethyl ether:hexanes (3×5 mL) gave 183.5 mg (45% yield) of a white solid.

$^1$H NMR (500 MHz, CDCl$_3$) δ 2.60 (s, 3H), 1.72 (d, J=21.2 Hz, 6H), 1.61 (d, J=8.9 Hz, 6H), 1.54 (m, 1H), 1.29 (ddt, J=16.0, 14.1, 7.4 Hz, 1H), 0.93 (app t, 6H), 0.77 (br m, 1H).

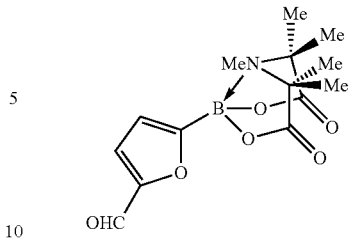

5-Formyl-2-furanyl TIDA Boronate

The general procedure was followed using TIDA (335.3 mg, 1.65 mmol, 1.1 eq.), 5-formyl-2-furylboronic acid (209.9 mg, 1.50 mmol, 1.0 eq.), and 15 mL of a 10:1 toluene:DMSO solvent mixture. Trituration with 1:1 diethyl ether:hexanes (3×5 mL) gave 170.2 mg of an off-white solid of ~85% purity (31% yield) by proton NMR.

$^1$H NMR (500 MHz, CDCl$_3$) δ 9.67 (s, 1H), 7.22 (d, J=3.5 Hz, 1H), 6.94 (d, J=3.5 Hz, 1H), 2.62 (s, 3H), 1.79 (br s, 6H), 1.62 (s, 6H).

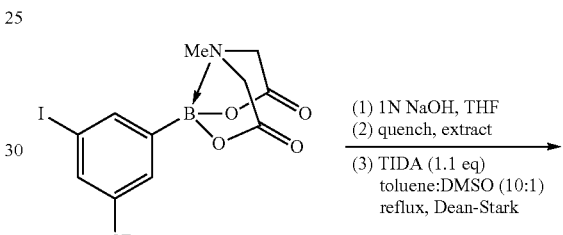

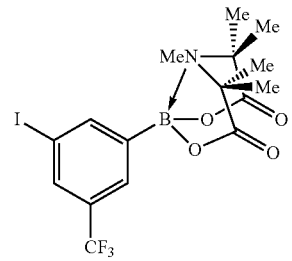

3-Iodo-5-(trifluoromethyl)phenyl TIDA Boronate

Under ambient atmosphere, a 40 mL vial was charged with 3-iodo-5-(trifluoromethyl)phenyl MIDA boronate (500 mg, 1.17 mmol, 1.0 eq.) and a stir bar. To this was added THF (7.5 mL), followed by aqueous NaOH (1 N, 3.5 mL, 3.5 mmol, 3.0 eq.). The vial was capped and stirred vigorously for 15 minutes. TLC (20% acetone/hexanes) showed complete conversion, so the reaction was quenched via the addition of sat. NH$_4$Cl (10 mL). The crude mixture was then partitioned between EtOAc (20 mL) and water (20 mL). The aqueous layer was then extracted with EtOAc (3×20 mL). The combined organics were then washed with brine (20 mL), dried over MgSO$_4$, filtered, and concentrated. The resulting wet solid was azeotroped with toluene (2×20 mL) until a minimum volume of toluene remained with solids suspended within it (~3 mL). To this crude solution of boronic acid in a 50 mL recovery flask was added toluene (15 mL) and DMSO (1.5 mL), followed by TIDA (261.3 mg, 1.29 mmol, 1.1 eq.). The flask was then fit with a Dean-Stark trap (prefilled with toluene) and a condenser. The flask was then refluxed with azeotropic removal of water for 3 hours. TLC (20% acetone/hexanes) showed complete conversion. The reaction was then worked up as in the general procedure and the resulting solid was triturated with 1:1 diethyl ether:hexanes (3×5 mL) to give 482.0 mg (85% yield) of a white solid.

$^1$HNMR (500 MHz, CDCl$_3$) δ 8.07 (s, 1H), 7.95 (s, 1H), 7.75 (s, 1H), 2.50 (s, 3H), 1.81 (br s, 6H), 1.55 (br s, 6H).

Example 9: Hydrolysis Assay Protocol

Figure 13:
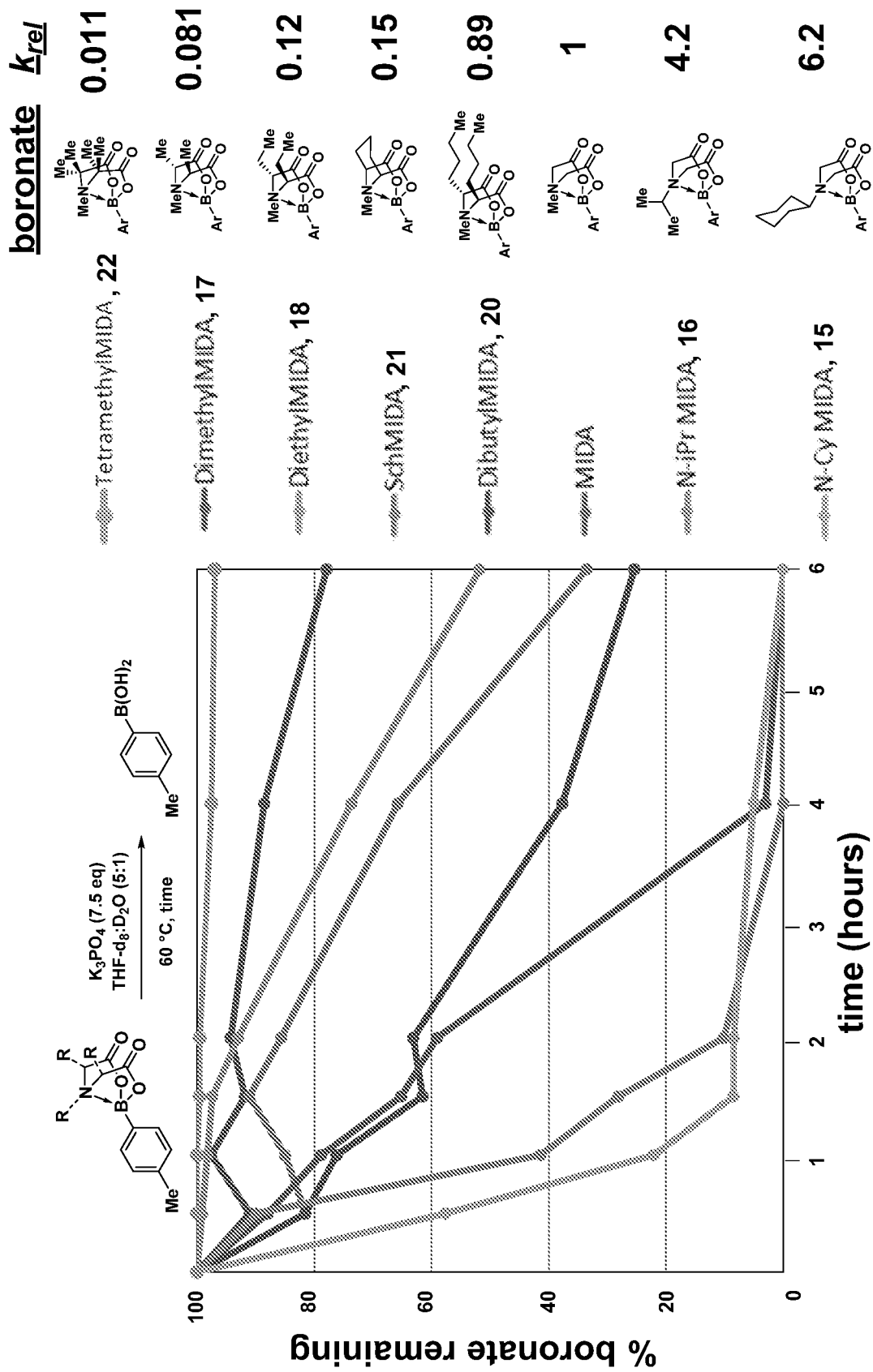
FIG. 13 is a chart showing the relative rates of hydrolysis of a series of MIDA boronate derivatives.

To each of twelve 1 mL conical vials equipped with stirring vanes was added 100 μL (0.08 M, 0.008 mmol) of a THF-d$_8$ solution of the indicated boronate, followed by 20 μL (3.0 M, 0.06 mmol, 7.5 eq.) of a D$_2$O solution of K$_3$PO$_4$. Each vial was then capped, shaken briefly to mix, and then stirred in a 60° C. heat block at 800 RPM. At the indicated times, two vials were removed from the heat block, cooled briefly under a stream of air, and then had 680 μL DMSO-d$_6$ containing 1,4-dimethoxybenzene (~0.008 M) as an internal standard added. The vials were then again briefly capped, shaken to mix, and the solutions were then immediately transferred to NMR tubes and spectra were taken (16 scans, d1=10 s). Time points were taken at 0, 0.5, 1, 1.5, 2.0, 4.0, and 6.0 hours. The solutions for the 0 time points were made directly in the NMR tubes, shaken, and then had spectra obtained. The percentage boronate remaining was determined by average the integration of the aryl protons (which fully resolved from the corresponding aryl protons on the parent boronic acid) across the two runs, except in the case of octyl TIDA boronate, for which the terminal methyl group of the octyl chain was used. Relative rate constants were obtained by assuming pseudo-first order kinetics and plotting the natural log of percentage boronate remaining vs time (ie. ln([boronate]/[boronate]$_o$) vs t) (FIG. 13).

Each time point represents the average of n=2 experiments, except in the case of the N-Cy and N-iPr MIDA, for which n=1.

REFERENCES

Barder, T. E.; Walker, S. D.; Martinelli, J. R.; Buchwald, S. L. J. Am. Chem. Soc. 2005, 127, 4685-4696.
Billingsley, K.; Buchwald, S. L. J. Am. Chem. Soc. 2007, 129, 3358-3366.
Cammidge, A. N. et al. Organic Letters 2006, 8, 4071-4074.
Deng, X.; Mayeux, A.; Cai, C. J. Org. Chem. 2002, 67, 5279-5283.
Gillis, E. P.; Burke, M. D. J. Am. Chem. Soc. 2007, 129, 6716-6717.
Hall, D. G. Boronic Acids, Wiley-VCH, Germany, 2005, 3-14.
Hohn, E.; Pietruszka, J. Adv. Synth. Catal. 2004, 346, 863-866.
Holmes, D., et al. Org. Lett. 2006, 8, 1407-1410.
Hopfl, H., J. Organomet. Chem. 581, 129-149, 1999.
Kerins, F.; O'Shea, D. F. J. Org. Chem. 2002, 67, 4968-4971.
Lee, S. J., Gray, K. C., Paek, J. S., Burke, M. D. J. Am. Chem. Soc. 2008, 130, 466-468.
Littke, A. F.; Dai, C.; Fu, G. C. J. Am. Chem. Soc. 2000, 122, 4020-4028.
Matteson, D. S. J. Am. Chem. Soc. 1960, 82, 4228-4233.
Miyaura, N.; Suzuki, A. Chem. Rev. 1995, 95, 2457-2483.
Molander, G. A; Ellis, N. Acc. Chem. Res. 2007, 40, 275-286.
Nicolaou, K. C., et al. Angew. Chem. Int. Ed. 2005, 44, 4442.
Noguchi, H.; Hojo, K.; Suginome, M. J. Am. Chem. Soc. 2007, 129, 758-759.
Tyrrell, E.; Brookes, P. Synthesis, 2003, 4, 469-483.
Wallace, D. J., Chen, C. Tetrahedron Lett. 2002, 43, 6987-6990.

INCORPORATION BY REFERENCE

All patents and published patent applications mentioned in the description above are incorporated by reference herein in their entirety.

EQUIVALENTS

Having now fully described the present invention in some detail by way of illustration and example for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

We claim:
1. A compound represented by formula I

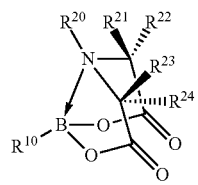

I wherein independently for each occurrence
$R^{10}$ is selected from the group consisting of unsubstituted alkyl, substituted or unsubstituted heteroalkyl, substituted or unsubstituted heterocycloalkyl, substituted or unsubstituted alkenyl, substituted or unsubstituted heteroalkenyl, substituted or unsubstituted alkynyl, substituted or unsubstituted heteroalkynyl, substituted or unsubstituted aryl, substituted or unsubstituted heteroaryl, substituted or unsubstituted aralkyl, and substituted or unsubstituted heteroaralkyl;
B is a boron having sp$^3$ hybridization;
$R^{20}$ is selected from the group consisting of substituted or unsubstituted alkyl, substituted or unsubstituted heteroalkyl, substituted or unsubstituted cycloalkyl, and substituted or unsubstituted heterocycloalkyl;
each of $R^{21}$ and $R^{24}$ is selected from the group consisting of H, substituted or unsubstituted alkyl, substituted or unsubstituted alkenyl, substituted or unsubstituted alkynyl, substituted or unsubstituted aryl, substituted or unsubstituted heteroaryl, substituted or unsubstituted aralkyl, and substituted or unsubstituted heteroaralkyl; or $R^{21}$ and $R^{24}$ taken together form a substituted or unsubstituted C$_1$-C$_5$ alkylene or substituted or unsubstituted C$_2$-C$_5$ alkenylene bridge between the carbon atoms to which they are attached, wherein any substituent on the C$_1$-C$_5$ alkylene or C$_2$-C$_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms;

each of $R^{22}$ and $R^{23}$ is selected from the group consisting of H, substituted or unsubstituted alkyl, substituted or unsubstituted alkenyl, substituted or unsubstituted alkynyl, substituted or unsubstituted aryl, substituted or unsubstituted heteroaryl, substituted or unsubstituted aralkyl, and substituted or unsubstituted heteroaralkyl;

$R^{21}$ and $R^{22}$, together with the carbon atom to which they are attached, may form a substituted or unsubstituted cycloalkyl, substituted or unsubstituted heterocycloalkyl, substituted or unsubstituted cycloalkenyl, or substituted or unsubstituted heterocycloalkenyl group; or $R^{21}$ and $R^{22}$, together with the carbon to which they are attached, may form a substituted or unsubstituted $C_3$-$C_6$ carbocyclic or substituted or unsubstituted 3- to 6-membered heterocyclic ring; and $R^{23}$ and $R^{24}$, together with the carbon atom to which they are attached, may form a substituted or unsubstituted cycloalkyl, substituted or unsubstituted heterocycloalkyl, substituted or unsubstituted cycloalkenyl, or substituted or unsubstituted heterocycloalkenyl group; or $R^{23}$ and $R^{24}$, together with the carbon to which they are attached, may form a substituted or unsubstituted $C_3$-$C_6$ carbocyclic or substituted or unsubstituted 3- to 6-membered heterocyclic ring;

provided that if (i) $R^{21}$ and $R^{24}$ taken together do not form a substituted or unsubstituted $C_1$-$C_5$ alkylene or substituted or unsubstituted $C_2$-$C_5$ alkenylene bridge; and (ii) $R^{21}$ and $R^{22}$, together with the carbon to which they are attached, do not form a substituted or unsubstituted $C_3$-$C_6$ carbocyclic or substituted or unsubstituted 3- to 6-membered heterocyclic ring; and (iii) $R^{23}$ and $R^{24}$, together with the carbon to which they are attached, do not form a substituted or unsubstituted $C_3$-$C_6$ carbocyclic or substituted or unsubstituted 3- to 6-membered heterocyclic ring, then:

(a) if $R^{20}$ is selected from the group consisting of methyl, isopropyl, 1-phenylethyl, 6,6-dimethylbicyclo[3.1.1]heptan-3-yl, 1-cyclohexylethyl, 2,6,6-trimethylbicyclo[3.1.1]heptan-3-yl, 1-benzyloxy-5-cyclopentyl, 2-(benzyloxy)cyclopentyl, 1,2,3,4-tetrahydronaphthalen-1-yl, 1-(4-methoxyphenyl)ethyl, 3,3-dimethylbutan-2-yl, 1-(naphthalen-l-yl)ethyl, and 1-phenylbutan-2-yl, then at least one of $R^{21}$, $R^{22}$, $R^{23}$, and $R^{24}$ is not H;

(b) if $R^{10}$ is phenyl and $R^2$ is methyl and $R^{21}$ is o-, m-, or p-$CH_3C_6H_4CH_2$-, then at least one of $R^{22}$, $R^{23}$, and $R^{24}$ is not H;

(c) if $R^{10}$ is phenyl and $R^{20}$ is methyl and $R^{22}$ is o-, m-, or p-$CH_3C_6H_4CH_2$-, then at least one of $R^{21}$, $R^{23}$, and $R^{24}$ is not H;

(d) if $R^{10}$ is phenyl and $R^{20}$ is benzyl and $R^{21}$ is a radical selected from the group consisting of methyl, ethyl, n-propyl, and n-butyl, then at least one of $R^{22}$, $R^{23}$, and $R^{24}$ is not H; and (e) if $R^{10}$ is phenyl and $R^{20}$ is benzyl and $R^{22}$ is a radical selected from the group consisting of methyl, ethyl, n-propyl, and n-butyl, then at least one of $R^{21}$, $R^{23}$, and $R^{24}$ is not H.

2. The compound of claim 1, wherein $R^{21}$ and $R^{24}$ are not identical.

3. The compound of claim 1, wherein $R^{21}$ and $R^{24}$ are identical.

4. The compound of claim 1, wherein $R^{21}$ and $R^{24}$ taken together form a substituted or unsubstituted $C_1$-$C_5$ alkylene or substituted or unsubstituted $C_2$-$C_5$ alkenylene bridge between the carbon atoms to which they are attached.

5. The compound of claim 1, wherein $R^{21}$ and $R^{24}$ taken together form a substituted or unsubstituted $C_3$ alkylene bridge between the carbon atoms to which they are attached.

6. The compound of claim 1, wherein none of $R^{21}$, $R^{22}$, $R^{23}$, and $R^{24}$ is H.

7. The compound of claim 1, wherein $R^{21}$, $R^{22}$, $R^{23}$, and $R^{24}$ are substituted or unsubstituted alkyl.

8. The compound of claim 7, wherein $R^{21}$, $R^{22}$, $R^{23}$, and $R^{24}$ are each methyl.

9. The compound of claim 1, wherein $R^{20}$ is alkyl.

10. The compound of claim 1, wherein $R^{20}$ is methyl.

11. The compound of claim 7, wherein $R^{20}$ is alkyl.

12. The compound of claim 7, wherein $R^{20}$ is methyl.

13. The compound of claim 8, wherein $R^{20}$ is alkyl.

14. The compound of claim 8, wherein $R^{20}$ is methyl.

15. The compound of claim 1, wherein each of $R^{21}$ and $R^{24}$ is selected from the group consisting of substituted or unsubstituted alkyl, substituted or unsubstituted alkenyl, substituted or unsubstituted alkynyl, substituted or unsubstituted aryl, substituted or unsubstituted heteroaryl, substituted or unsubstituted aralkyl, and substituted or unsubstituted heteroaralkyl; or $R^{21}$ and $R^{24}$ taken together form a substituted or unsubstituted $C_1$-$C_5$ alkylene or substituted or unsubstituted $C_2$-$C_5$ alkenylene bridge between the carbon atoms to which they are attached, wherein any substituent on the $C_1$-$C_5$ alkylene or $C_2$-$C_5$ alkenylene bridge is alkyl or halogen, or a 3- to 6-membered spirocyclic carbocyclic or heterocyclic ring attached to one bridging carbon atom, or a 3- to 6-membered carbocyclic or heterocyclic ring fused to two adjacent bridging carbon atoms.

16. The compound of claim 15, wherein $R^{20}$ is alkyl.

17. The compound of claim 15, wherein $R^{20}$ is methyl.

18. The compound of claim 15, wherein $R^{22}$ and $R^{23}$ are H.

19. The compound of claim 18, wherein $R^{20}$ is alkyl.

20. The compound of claim 18, wherein $R^{20}$ is methyl.

21. The compound of claim 1, wherein at least one of $R^{21}$, $R^{22}$, $R^{23}$, and $R^{24}$ is not H.

22. The compound of claim 21, wherein $R^{20}$ is alkyl.

23. The compound of claim 21, wherein $R^{20}$ is methyl.

* * * * *